US012665542B2

(12) United States Patent　　Lin

(10) Patent No.: US 12,665,542 B2
(45) Date of Patent: Jun. 23, 2026

(54) PHOTOVOLTAIC FRAME AND PHOTOVOLTAIC MODULE

(71) Applicant: Backbone (Jiangsu) Co., Ltd., Changshu (CN)

(72) Inventor: Renjun Lin, Changshu (CN)

(73) Assignee: Backbone (Jiangsu) Co., Ltd., Changshu City (CN)

( * ) Notice: Subject to any disclaimer, the term of this patent is extended or adjusted under 35 U.S.C. 154(b) by 2 days.

(21) Appl. No.: 18/866,843

(22) PCT Filed: May 22, 2023

(86) PCT No.: PCT/CN2023/095442
§ 371 (c)(1),
(2) Date: Nov. 18, 2024

(87) PCT Pub. No.: WO2023/226912
PCT Pub. Date: Nov. 30, 2023

(65) Prior Publication Data
US 2025/0343502 A1　　Nov. 6, 2025

(30) Foreign Application Priority Data

May 23, 2022　(CN) .......................... 202210565427.0
May 23, 2022　(CN) .......................... 202221348339.7
(Continued)

(51) Int. Cl.
*H02S 30/10*　　(2014.01)
*F16B 7/04*　　(2006.01)
*H02S 40/34*　　(2014.01)

(52) U.S. Cl.
CPC ............ *H02S 30/10* (2014.12); *F16B 7/0446* (2013.01); *H02S 40/34* (2014.12)

(58) Field of Classification Search
None
See application file for complete search history.

(56) References Cited

FOREIGN PATENT DOCUMENTS

CN　　208272919 U　　12/2018
CN　　213906609 U　　8/2021
(Continued)

*Primary Examiner* — Dustin Q Dam
(74) *Attorney, Agent, or Firm* — Sisson & Banyas, Attorneys at Law, LLC; Jeffrey J. Banyas

(57) ABSTRACT

This invention relates to the field of photovoltaic module technology and discloses a photovoltaic frame and a photovoltaic module. The photovoltaic frame, comprising multiple steel frame strips connected end-to-end in sequence and corner connectors joining steel frame strips adjacent to each other at a corner; wherein each steel frame strip comprises: a first mounting chamber and second mounting chamber, the second mounting chamber includes a fourth steel wall, the top and bottom of the fourth steel wall are bent to connect to the protruding/recessing portion and one side of the fifth steel wall, respectively, and the free end of the fifth steel wall has a bent section; the corner connector comprises a first connecting part and a second connecting part, joined by a bend; the first connecting part comprises a first connecting wall and a second connecting wall connected by a bend, while the second connecting part comprises a third connecting wall and fourth connecting wall connected by a bend; both the first connecting wall and the third connecting wall are vertical or horizontal steel walls, while the second connecting wall and fourth connecting wall can be horizontal or vertical steel walls; the upper end of the vertical steel wall snaps into the protruding/recessing portion, and the horizontal steel wall snaps into a chamber defined by the lower end of the fourth steel wall, the fifth steel wall, and the bent section on the free end of the fifth steel wall. Thus, the mechanical strength and installation stability of the photovoltaic frame can be improved, and the cost can be reduced.

31 Claims, 21 Drawing Sheets

(30)        Foreign Application Priority Data

| | | |
|---|---|---|
| May 23, 2022 | (CN) | ......................... 202221348401.2 |
| May 23, 2022 | (CN) | ......................... 202221359367.9 |
| Jul. 4, 2022 | (CN) | ......................... 202221704793.1 |
| Jul. 4, 2022 | (CN) | ......................... 202221705559.0 |

(56)        References Cited

FOREIGN PATENT DOCUMENTS

| | | | |
|---|---|---|---|
| CN | 115050848 | A | 9/2022 |
| CN | 217563597 | U | 10/2022 |
| CN | 217563598 | U | 10/2022 |
| CN | 217643267 | U | 10/2022 |
| CN | 217643271 | U | 10/2022 |
| CN | 217643272 | U | 10/2022 |
| JP | 2017133239 | A | 8/2017 |

PHOTOVOLTAIC FRAME AND PHOTOVOLTAIC MODULE

PRIORITIES AND CROSS REFERENCES

This Application claims priority from International Application No. PCT/CN2023/095442 filed on 22 May 2023, Chinese Application No. 202221705559.0 filed on 4 Jul. 2022, Chinese Application No. 202221704793.1 filed on 4 Jul. 2022, Chinese Application No. 202210565427.0 filed on 23 May 2022, Chinese Application No. 202221359367.9 filed on 23 May 2022, Chinese Application No. 202221348401.2 filed on 23 May 2022, and Chinese Application No. 202221348339.7 filed on 23 May 2022, the teachings of each of which are incorporated by reference herein in their entirety.

TECHNICAL FIELD

The present invention relates to the technical field of photovoltaic modules, specifically to a photovoltaic frame and photovoltaic module.

BACKGROUND TECHNOLOGY

In existing photovoltaic modules, aluminum frames are typically used to encapsulate photovoltaic laminates. For example, the high-bearing-pressure adhesive-repairing-free photovoltaic module frame disclosed in CN104022726B utilizes this approach. Such aluminum frames usually consist of four aluminum frame strips that connect end-to-end (typically including two long frame strips and two short frame strips arranged opposite each other) and connecting pieces (also known as corner connectors) that connect adjacent aluminum frame strips at the corners. In conventional aluminum frames, the corner connectors are also made of aluminum material (such as the aluminum alloy corner connector for photovoltaic module frames disclosed in publication CN207354209U), rather than using steel frames. This is because a mixed installation of steel and aluminum can easily lead to electrochemical corrosion, adversely affecting the encapsulation of the photovoltaic laminate.

However, the energy consumption for producing aluminum ingots using modern aluminum industrial processes is high, and the raw materials required are numerous, resulting in high production costs for aluminum ingots. Additionally, aluminum corner connectors must go through multiple complex processes, such as extrusion, cutting, perforating, and surface treatment, which further contributes to the high production costs of photovoltaic modules. Moreover, as the size of photovoltaic modules increases, the mechanical strength requirements for the frames also become higher. However, the mechanical strength of existing aluminum frames is relatively low, making them unsuitable for large-sized photovoltaic modules.

Based on such, to accommodate larger photovoltaic modules, high-mechanical-strength frames are being gradually developed, such as the solar photovoltaic panel steel frame assembly and photovoltaic module disclosed in publication CN214959424U. Compared to aluminum, steel has higher mechanical strength, making it suitable for large-sized photovoltaic modules. However, this solar photovoltaic panel steel frame assembly features a straight segment at the top of the supporting section, which is stacked with the fourth segment, preventing the formation of a protruding/recessing portion for securing the upper end of the corner connector. As a result, the upper end of the corner connector can easily shift laterally along the fifth segment, leading to an unstable and insecure installation, which affects the encapsulation stability of the photovoltaic module and makes it difficult to adapt to larger sizes. Additionally, the straight fifth segment is prone to deformation under external pressure, resulting in weaker mechanical strength, which similarly hampers its suitability for large photovoltaic modules.

Furthermore, as shown in publication CN213906609U, a photovoltaic module frame made of steel can improve its mechanical strength through the use of reinforcing ribs on the fourth side wall. However, since both connecting parts of the corner connector are required to be covered on the outer side of the frame structure, the exposed corner connector requires various rust and corrosion treatments, which can also affect the flatness of the external structure of the photovoltaic module. Moreover, the corner connector not only requires two vertical side walls but also needs horizontal side walls on the bottom and top surfaces of each vertical side wall to cover the outer side of the frame structure. Consequently, this corner bracket requires at least six side walls, resulting in a complex structure that consumes a significant amount of steel, keeping production costs relatively high.

SUMMARY OF INVENTION

The purpose of this invention is to overcome the shortcomings of existing technology by providing a photovoltaic frame and photovoltaic module that enhance the mechanical strength and installation stability of the frame, thereby improving the encapsulation stability of the photovoltaic module. This design can effectively accommodate large-sized photovoltaic modules and further reduce costs.

Based on such, the present invention provides a photovoltaic frame, comprising multiple steel frame strips connected end-to-end in sequence and corner connectors joining steel frame strips adjacent to each other at a corner;

wherein the steel frame strip comprises: a first mounting chamber configured to secure a photovoltaic laminate using encapsulating adhesive, and a second mounting chamber positioned below the first mounting chamber for mounting the corner connector; the first mounting chamber includes a first steel wall, a second steel wall, and a third steel wall connected sequentially by bends, with the upper and lower ends of the second steel wall respectively connecting to the left sides of the first steel wall and third steel wall to form an opening on the right side of the first mounting chamber; the second mounting chamber includes a fourth steel wall and a fifth steel wall connected sequentially by bends, the top inside the second mounting chamber having a protruding/recessing portion connected by bends to the third steel wall and for the upper end of the corner connector to snap fit; the upper and lower ends of the fourth steel wall are connected by bends to the protruding/recessing portion and one side of the fifth steel wall, respectively, and the free end of the fifth steel wall has a bent section for accommodating the lower end of the corner connector to snap into place;

the corner connector comprises a first connecting part and a second connecting part, joined by a bend; the first connecting part and the second connecting part are respectively installed within the second mounting chambers of two steel frame strips adjacent to each other at a corner; the first connecting part comprises a first connecting wall and a second connecting wall connected by a bend, while the second connecting part comprises a third connecting wall and fourth connecting wall connected by a bend; both the first connecting wall and the third connecting wall are vertical or horizontal steel walls, while both the second connecting wall and the fourth connecting wall are horizontal or vertical steel walls; the upper end of the vertical steel wall snaps into the protruding/recessing portion, and the horizontal steel wall snaps into a chamber formed by the lower end of the fourth steel wall, the fifth steel wall, and the bent section.

A photovoltaic frame, comprising a frame and cross bar, wherein the frame comprises multiple steel frame strips and corner connectors connecting steel frame strips adjacent to each other at corners, the frame is a photovoltaic frame as described, the steel frame strips are fixed around the photovoltaic laminate, and the cross bar is installed on the back of the photovoltaic laminate with the ends of the cross bar snap into the steel frame strips.

A photovoltaic module, comprising a photovoltaic laminate and a photovoltaic frame for mounting the photovoltaic laminate; the photovoltaic frame is any one of the photovoltaic frames described above.

Preferably, the photovoltaic frame is fixed around the photovoltaic laminate, the photovoltaic frame is provided with a cross bar, and the photovoltaic laminate comprises a back panel, a first adhesive film, a cell string, a second adhesive film, and a front panel stacked in sequence; the front panel comprises two glass front panels mounted side by side on the second adhesive film; a buffer gap is formed between the two glass front panels, and a sealing strip is provided in the buffer gap.

Compared with existing technology, this invention offers the following benefits:

In the photovoltaic frame of present invention, the protruding/recessing portion of the steel frame strip can secure the upper end of the vertical steel wall of the corner connector, allowing the upper end of the corner fitting to be stably and firmly installed within the second installation chamber. Additionally, the free end of the fifth steel wall has a bending section, which enables the flat steel wall at the lower end of the corner connector to snap into the cavity formed by the lower end of the fourth steel wall, the fifth steel wall, and the bent section. Thus also stabilizing and securing the lower end of the corner connector within the second installation chamber. This structural integration of the steel frame strips and the corner connectors, as well as the mutual reinforcement between the second installation chamber, the protruding/recessing portion, and the bent section, allow the entire corner connector to be firmly installed in the second installation chamber, enhancing the encapsulation stability of the photovoltaic module. Additionally, the steel frame strip is made from high-strength steel, and the protruding/recessing portion increases the number of bends at the top of the second installation chamber, preventing deformation in the second installation chamber and improving the mechanical strength of both the second installation chamber and the overall steel frame strip.

Furthermore, the corner connectors require only four connecting walls to achieve a stable and secure installation with the steel frame, resulting in a simpler structure. Consequently, this photovoltaic frame not only better meets the high demands for encapsulation stability and mechanical strength in large-sized photovoltaic modules, but also simplifies the corner fitting structure, reduces steel consumption, and lowers costs.

DESCRIPTION OF REFERENCE NUMBERS IN THE DRAWINGS

Steel frame strip: 01; First mounting chamber: 1; Mounting chamber opening: 11; First steel wall: 12; Lower pressed edge: 121; Transition section: 122; Second steel wall: 13; Third steel wall: 14; Adhesive chamber: 15; Adhesive collecting groove 151; overflow prevention groove: 152; Inclined chamber: 153; Reinforcing wall: 16; Second mounting chamber: 2; Fourth steel wall: 21; Fifth reinforcing rib: 211; Fifth steel wall: 22; protruding/recessing portion 23; Sixth steel wall: 231; Seventh steel wall: 232; Eighth steel wall: 233; Ninth steel wall: 234; Tenth steel wall: 235; Eleventh steel wall: 236; Second reinforcing rib: 237; Third reinforcing rib: 238; Bent section: 24; Inner edge: 241; Buffer chamber: 25; Recessed hole: 26; First slot: 27; Long frame strip: 01A; Short frame strip: 01B;

Adhesive layer: 02;

Cross bar: 03; Junction box installation chamber: 31; Cable hole: 311; Groove: 32; Mounting section: 33; First locking block: 331; Front sidewall: 332; Rear sidewall: 333; Fourth reinforcing rib: 334; Third slot: 34; Notch: 35

Corner connector: 04; First connecting part: 41; First connecting wall: 411; Second connecting wall: 412; Second slot: 4121; Second connecting part: 42; Third connecting wall: 421; Fourth connecting wall: 422; Second locking block: 4221; First reinforcing Rib: 423; Sixth reinforcing rib: 424; Serrated structure: 43; First reversed tooth: 431; Second reversed tooth: 432; Tooth tip: 433; First bend line: 44; Second bend line: 45; Third bend line: 46; Fourth bend line: 47; Horizontal steel wall: 48; Vertical steel wall: 49;

Photovoltaic Laminate: 05; Back panel: 51; Glass front panel: 52; Buffer gap: 521; Cell string: 53; Sealing strip: 54; Junction Box: 06

DETAILED EMBODIMENTS

To make the above objectives, features, and advantages of the present invention more clear and understandable, the following provides a further detailed description of the invention in conjunction with the accompanying drawings and specific embodiments.

Embodiment 1

Figures 1, 2:
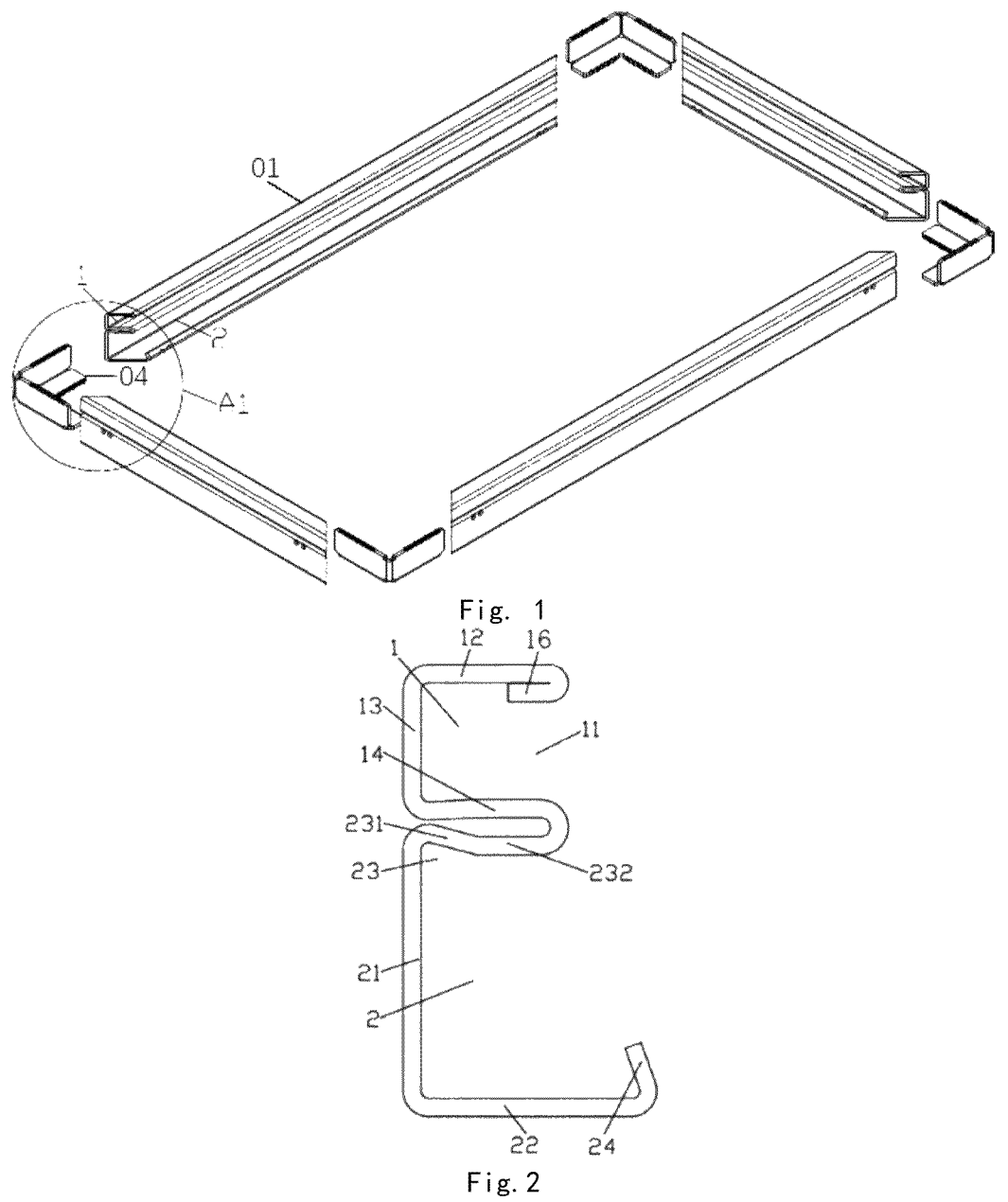
FIG. 1: An exploded structural schematic of a photovoltaic frame in Embodiment 1.
FIG. 2: A cross-sectional schematic of a steel frame strip in Scheme 1 of Embodiment 1.

A photovoltaic frame in this embodiment, as shown in FIG. 1, includes multiple steel frame strips 01 joined end-to-end and corner connectors 04 used to connect the ends of two adjacent steel frame strips 01 at the corners.

In this embodiment, the steel frame strips 01, as shown in FIG. 2, includes a first mounting chamber 1 and a second mounting chamber 2 located below the first mounting chamber 1.

Figures 3, 4:
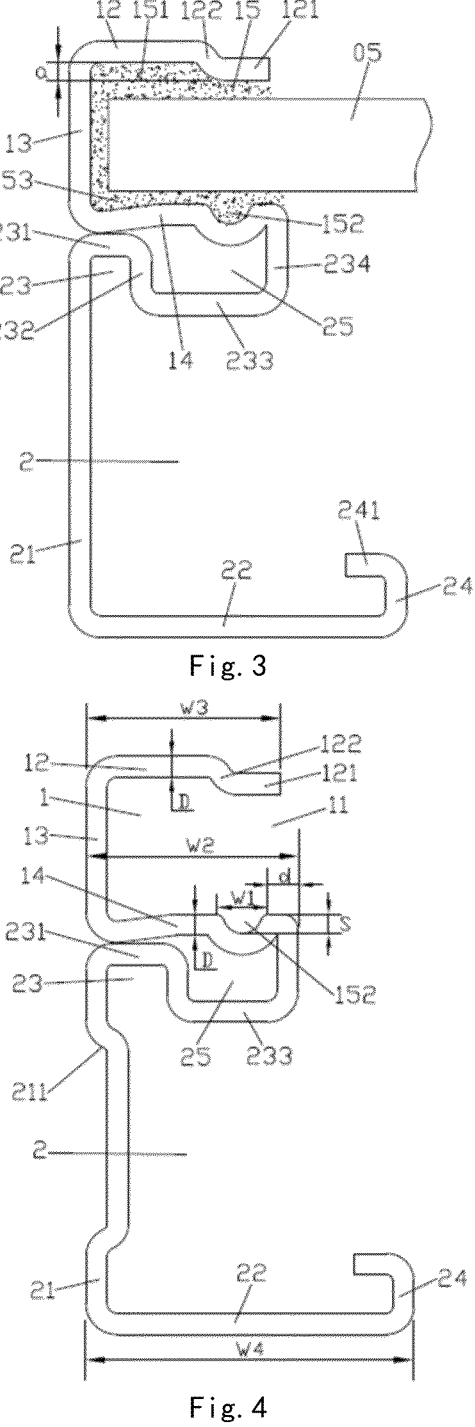
FIG. 3: A cross-sectional schematic of another steel frame strip in Embodiment 1, showing installation with encapsulating adhesive and photovoltaic laminate.
FIG. 4: A cross-sectional schematic of another steel frame strip in Embodiment 1.

As shown in FIGS. 2-3, the first mounting chamber 1 is used to mount and secure the photovoltaic laminate 05 by injecting encapsulating adhesive, while the second mounting chamber 2 is used to mount the corner connectors 04 (as shown in FIG. 1).

The first mounting chamber 1 comprises a first steel wall 12, a second steel wall 13, and a third steel wall 14 connected by sequential bends. The upper end of the second steel wall 13 is bent and connected to the left side of the first steel wall 12, while the lower end of the second steel wall 13 is bent and connected to the left side of the third steel wall 14. Together, the first steel wall 12, second steel wall 13, and third steel wall 14 form a C-shaped first mounting chamber 1, creating an mounting chamber opening 11 on the right side of the first mounting chamber 1 allowing the side edge of the photovoltaic laminate 05 inserted into the first mounting chamber 1. This structure facilitates the installation of the photovoltaic laminate 05 and the injection of the encapsulating adhesive. The second steel wall 13 is preferably set vertically, while the first steel wall 12 and the third steel wall 14 are preferably set horizontally.

Further, an adhesive chamber 15 is provided within the first mounting chamber 1. Specifically, the adhesive chamber 15 is formed between the inner side walls of each steel wall of the first mounting chamber 1 (namely, the first steel wall 12, the second steel wall 13, and the third steel wall 14) and the outer side surface of the photovoltaic laminate 05 installed in the first mounting chamber 1 (the filled area shown in FIG. 3 represents the adhesive chamber 15). The adhesive chamber 15 is designed in a C-shape to hold an adhesive used for encapsulation (hereinafter referred to as encapsulation adhesive). The encapsulation adhesive within the adhesive chamber 15 enables firm adhesion between the inner surfaces of each steel wall in the first mounting chamber 1 and the corresponding outer surface of the photovoltaic laminate 05, thereby securing the photovoltaic laminate 05 firmly within the first mounting chamber 1 through the encapsulation adhesive.

Figures 5, 6, 7:
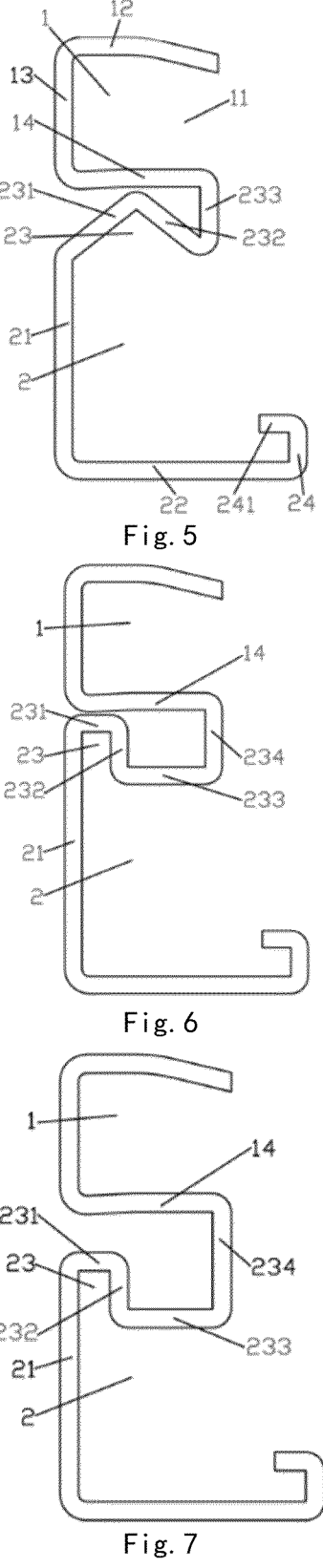
FIG. 5: A cross-sectional schematic of a steel frame strip in Scheme 2 of Embodiment 1.
FIG. 6: A cross-sectional schematic of a steel frame strip in Scheme 3 of Embodiment 1.
FIG. 7: A cross-sectional schematic of another steel frame strip in Scheme 3 of Embodiment 1.

In an example of this embodiment, the right side of the first steel wall 12 tilts inward toward the mounting chamber opening 11 (as shown in FIG. 5), allowing the right side of the first steel wall 12 to tightly secure the photovoltaic laminate 05, thereby making the installation of the photovoltaic laminate 05 within the first mounting chamber 1 more stable and secure. Alternatively, in another example of this embodiment, a reinforcing wall 16 is connected under the first steel wall 12 and folded flat against the first steel wall 12 (as shown in FIG. 2). The length of the reinforcing wall 16 is less than or equal to the length of the first steel wall 12, preferably less. Providing the reinforcing wall 16 not only reduces the size of the mounting chamber opening 11, allowing the first steel wall 12 to secure the photovoltaic laminate 05 with the aid of the reinforcing wall 16, but also provides support to the first steel wall 12, enhancing its mechanical strength.

In a preferred configuration of this embodiment, referring to FIGS. 3-4, the right end of the first steel wall 12 is pressed downward to form a lower pressed edge 121. This lower pressed edge 121 narrows the upper right part of the adhesive chamber 15. Thus, compared to the upper right part of the adhesive chamber 15, the upper left part becomes relatively wider, forming an adhesive collecting groove 151 (as shown in FIG. 3). There is no need to bend the steel at the right end of the first steel wall 12 inward to seal the edge of the adhesive chamber 15 to form the adhesive collecting groove 151; this design of the lower pressed edge 121 saves steel material, reducing steel costs. Moreover, unlike the double-layered steel thickness of the third side wall in existing technologies (such as CN213906609U), the lower pressed edge 121 is only one layer of steel, reducing the thickness by half. This decreases the amount of water and dust accumulated on the photovoltaic laminate 05 at the right end surface of the lower pressed edge 121, improving the long-term outdoor water and dust resistance of the photovoltaic laminate 05. Preferably, referring to FIG. 4, the height of the right end surface of the lower pressed edge 121 is less than twice the thickness D of the first steel wall 12; and the height of the right end surface of the lower pressed edge 121 is greater than or equal to 0.5 times the thickness D of the first steel wall 12 to reduce water and dust accumulated on the photovoltaic laminate 05 at the right end surface of the lower pressed edge 121.

Moreover, the left end of the first steel wall 12 is positioned above the lower pressed edge 121, meaning there is a height difference between the left end of the first steel wall 12 and the lower pressed edge 121. The first steel wall 12 also includes a transition section 122 that connects smoothly to the lower pressed edge 121, creating a gentle slope between the left end of the first steel wall 12 and the lower pressed edge 121. This design, combining the lower pressed edge 121 and the transition section 122, accelerates the flow of rainwater across the upper surface of the first steel wall 12, facilitating automatic cleaning by rain.

Additionally, as shown in FIG. 3, the transition section 122 provides a sloped, smooth connection between the adhesive collecting groove 151 and the upper-right portion of the adhesive chamber 15. This allows any small amounts of excess encapsulation adhesive spilling over from the adhesive collecting groove 151 to flow more smoothly into the upper-right portion of the adhesive chamber 15, helping to create an even adhesive layer within this area. This prevents adhesive shortages in the upper-right part of the adhesive chamber 15 that could otherwise result in uneven adhesive layer thickness, thus improving the encapsulation effectiveness of the photovoltaic laminate 05.

Further, as shown in FIGS. 3-4, the height (a) of the adhesive collecting groove 151 is less than or equal to the thickness (D) of the first steel wall 12. This design ensures the effectiveness of the encapsulation while also saving adhesive material, thus reducing costs. Specifically, the thickness (D) of the first steel wall 12 is the thickness of one steel layer.

In one example of this embodiment, the part of first steel wall 12 above the adhesive collecting groove 151 is arranged horizontally. In another example, the part of first steel wall 12 above the adhesive collecting groove 151 is arranged at an incline. When the part of first steel wall 12 above the adhesive collecting groove 151 is inclined, it preferably slopes downward from left to right to maintain effective encapsulation.

Additionally, a part of the third steel wall 14 is recessed to form an overflow prevention groove 152 connected to the adhesive chamber 15. This overflow prevention groove 152 increases the storage capacity of the adhesive within the lower part of the adhesive chamber 15 to prevent excess adhesive from spilling out. Furthermore, as this overflow prevention groove 152 is formed by a recess in the third steel wall 14, it increases the contact area between the third steel wall 14 and the encapsulating adhesive. The cured excess adhesive within the overflow prevention groove 152 forms a protruding adhesive section, which, together with the recessed overflow prevention groove 152, creates a snap-fit structure similar to a concave-convex interlocking design. This configuration increases the bonding strength between the photovoltaic laminate 05, the encapsulating adhesive, and the third steel wall 14, enhancing the lateral tensile strength of the laminate and adhesive against the steel frame. Additionally, the overflow prevention groove 152 can be considered as a reinforcing rib for the third steel wall 14. Under positive wind pressure, the overflow prevention groove 152 also acts as a buffer, helping to counteract wave forces exerted by the photovoltaic laminate 05 on the steel frame. The overflow prevention groove 152 is preferably located towards the right of the center of the third steel wall 14.

Specifically, as shown in FIGS. 3-4, the overflow prevention groove 152 is positioned toward the right side of the middle of the third steel wall 14, meaning that it is near the photovoltaic laminate 05 exposed outside of the steel frame strip. The ratio of the depth (S) of the overflow prevention groove 152 to its opening width (W1) is less than half of the width (W3) of the first steel wall 12. Additionally, the ratio of the depth (S) of the overflow prevention groove 152 to the thickness (D) of the third steel wall 14 is greater than half of the thickness (D) of the third steel wall 14. This design ensures the groove's position and dimensions are optimized. Through repeated testing, the applicant found that positioning the overflow prevention groove 152 near the photovoltaic laminate 05 exposed outside the steel frame strip, combined with the dimensional design of both the overflow prevention groove 152 and the third steel wall 14, results in a larger groove with deeper depth (S). As a result, the overflow prevention groove 152 acts as a buffer zone for the photovoltaic laminate 05 under positive wind pressure. This design effectively mitigates wave forces exerted by the vibrating photovoltaic laminate 05 on the steel frame strip, thus enhancing the encapsulation performance and lifespan of the photovoltaic module during long-term outdoor use, while also improving its stability and reliability. Optimized, the thickness (D) of the first steel wall 12 equal to the thickness of the third steel wall 14, each being the thickness of one steel layer.

Specifically, the distance (d) between the right side of the overflow prevention groove 152 and the right end of the third steel wall 14 is greater than or equal to the thickness (D) of the third steel wall 14. This spacing ensures that while the overflow prevention groove 152 is close to the exposed photovoltaic laminate 05, minor adhesive overflow does not extend onto the exposed surface of the photovoltaic laminate 05, which could otherwise impact the appearance of the encapsulation and potentially cause shading that affects power output.

Additionally, the width (W1) of the opening of the overflow prevention groove 152 is less than half of the width (W2) of the third steel wall 14 to prevent excessive adhesive waste from an overly wide opening.

Moreover, the cross-section of the overflow prevention groove 152 is semi-circular or semi-elliptical, with the upper end open. This shape allows the adhesive in the lower part of the adhesive chamber 15 to smoothly flow into the overflow prevention groove 152, facilitating a uniform overflow structure within the overflow prevention groove 152 and improving the encapsulation performance of the photovoltaic laminate 05.

Furthermore, the height of the left side inside the first mounting chamber 1 is greater than the height of the mounting chamber opening 11 (where the height of the mounting chamber opening 11 is the distance from its top to bottom, excluding the steel wall thickness that forms it; other component heights are similar to that of the mounting chamber opening 11). This increases the height of the left side inside the first mounting chamber 1, allowing it to hold more adhesive and ensuring effective encapsulation of the photovoltaic laminate 05 within the first mounting chamber 1. The left end of the third steel wall 14 slopes upward from left to right, forming an inclined chamber 153 in the lower left part of the adhesive chamber 15 (as shown in FIG. 3). The inclined chamber 153 is located on the left side of the overflow prevention groove 152 and it is connected to the overflow prevention groove 152. Increasing the height of the corresponding side of the first mounting chamber 1 (i.e., the left side of the first mounting chamber 1) and setting up the inclined chamber 153 provides buffering under both positive and negative wind pressure, preventing vertical edge movement of the photovoltaic laminate 05 and further enhancing the stability and reliability of the entire photovoltaic module during long-term outdoor use.

Furthermore, the distance between the right side of the third steel wall 14 and the left side of the photovoltaic laminate 05 installed in the first mounting chamber 1 is preferably less than 9 mm, which minimizes shading from the steel frame strip to the photovoltaic laminate 05 while ensuring effective encapsulation.

As shown in FIGS. 1-2, the second mounting chamber 2 includes the fourth steel wall 21 and fifth steel wall 22, which are connected through a series of bends. The top of the second mounting chamber 2 has a protruding/recessing portion 23, bent and connected to the third steel wall 14; the protruding/recessing portion 23 holds the upper end of the corner connector 04 securely, ensuring stable and solid installation of the corner connector 04 within the second mounting chamber 2.

As shown in FIGS. 3-4, the width (W3) of the first steel wall 12 is less than or equal to the width (W2) of the third steel wall 14, the width (W2) of the third steel wall 14 is less than the width (W4) of the fifth steel wall 22. The ratio of the width (W4) of the fifth steel wall 22 to the width (W2) of the third steel wall 14 is between 1:1 and 4:1, preferably 2:1. By defining the width of each of these steel walls in this way, the design minimizes shading from the steel frame on the backside of the photovoltaic laminate 05, allowing more reflected light to enhance power generation.

Additionally, as shown in FIGS. 1-2, the fourth steel wall 21 is on the same side as the protruding/recessing portion 23 and the fifth steel wall 22. The upper end of the fourth steel wall 21 is bent and connected to one side of the protruding/recessing portion 23 (e.g., the left or right side), and the lower end of the fourth steel wall 21 is bent and connected to one side of the fifth steel wall 22 (e.g., the left or right side). Preferably, the fourth steel wall 21 is on the left side of both the protruding/recessing portion 23 and the fifth steel wall 22, with the upper end bent to connect to the left side of the protruding/recessing portion 23 and the lower end bent to connect to the left side of the fifth steel wall 22. The right side of the protruding/recessing portion 23 is bent to connect to the right side of the third steel wall 14. This structure enables a more vertically compact layout between the second mounting chamber 2 and the first mounting chamber 1, thus conserving steel usage. The fourth steel wall 21 is preferably positioned vertically, while the fifth steel wall 22 is positioned horizontally.

Furthermore, the free end (e.g., the right end) of the fifth steel wall 22 has a bent section 24 extending upward along its right side. This bent section 24 allows the lower end of the corner connector 04 to snap into the chamber formed by the lower end of the fourth steel wall 21, the fifth steel wall 22, and the bent section 24, thereby ensuring the corner connector 04 is stably and securely installed within the second mounting chamber 2.

In practical applications, the fifth steel wall 22 is provided with mounting elements (such as threaded holes or studs) to facilitate mounting the entire steel frame strip 01 onto an external bracket via the mounting elements.

In one example of this embodiment, as shown in FIGS. 1-2, the upper end of the bent section 24 is inclined towards the second mounting chamber 2 (as shown in FIG. 2), so that the right side of the lower end of the corner connector 04 is clamped by the upper end of the bent section 24. Alternatively, in another example, the upper end of the bent section 24 has an inner edge 241 extending horizontally inward to the second mounting chamber 2 (as shown in FIG. 3), allowing the right side of the lower end of the corner connector 04 to be clamped within the chamber formed by the right side of the fifth steel wall 22, the bent section 24, and its inner edge 241.

In practice, the upper end of the corner connector 04 can be designed in various shapes, and the protruding/recessing portion 23 can be configured accordingly to ensure the upper end of the corner connector 04 is securely clamped, thereby enhancing the mechanical strength of the protruding/recessing portion 23 and the entire steel frame strip 01. Specific designs are as follows:

Design 1: As shown in FIG. 2, the protruding/recessing portion 23 consists of the sixth steel wall 231 and the seventh steel wall 232. The left side of the sixth steel wall 231 engages with the lower left of the third steel wall 14 to provide support. The left side of the sixth steel wall 231 is bent to connect with the upper end of the fourth steel wall 21. The sixth steel wall 231 slopes downward from left to right, while the left side of the seventh steel wall 232 connects to the lower right end of the sixth steel wall 231. The right side of the seventh steel wall 232 connects with the right side of the third steel wall 14 and bends to form a smooth transition. This arrangement creates a recessing part formed by the upper end of the fourth steel wall 21 and the left side of the sixth steel wall 231, and a protruding part formed by the right side of the sixth steel wall 231 and the seventh steel wall 232. This configuration allows for the clamping of the upper end of the corner connector 04, preventing it from moving laterally. The seventh steel wall 232 is preferably horizontal; and in this case, the seventh steel wall 232 is separate from the third steel wall 14.

Design 2: As shown in FIG. 5, the protruding/recessing portion 23 includes the sixth steel wall 231, seventh steel wall 232, and eighth steel wall 233. The sixth steel wall 231 slopes upward from left to right, while the seventh steel wall 232 slopes upward from right to left, with the upper right end of the sixth steel wall 231 connecting to the upper left end of the seventh steel wall 232. The connection engages with the lower side of the third steel wall 14, providing support. The lower left end of the sixth steel wall 231 is bent to connect to the upper end of the fourth steel wall 21. The lower end of the eighth steel wall 233 is bent to connect with the lower right end of the seventh steel wall 232, and the upper end of the eighth steel wall 233 is bent to connect with the right side of the third steel wall 14. This creates a recessing part formed by the sixth and seventh steel walls 231 and 232, and a protruding part formed by the seventh and eighth steel walls 232 and 233. This structure enables the upper end of the corner connector 04 to be clamped securely, preventing it from moving laterally. The eighth steel wall 233 is preferably vertical. The angle between the sixth and seventh steel walls 231 and 232 ideally set between 30° and 150°, and the sixth and seventh steel walls 231 and 232 are preferably arranged symmetrically.

Design 3: Referring to FIGS. 3-4 and 6-11, the protruding/recessing portion 23 includes the sixth steel wall 231, seventh steel wall 232, eighth steel wall 233, and ninth steel wall 234. The left side of the sixth steel wall 231 is bent and connected to the upper end of the fourth steel wall 21, while the right side of the sixth steel wall 231 is bent and connected to the upper end of the seventh steel wall 232. The left side of the eighth steel wall 233 is bent and connected to the lower end of the seventh steel wall 232, and the right side of the eighth steel wall 233 is bent and connected to the lower end of the ninth steel wall 234. The upper end of the ninth steel wall 234 is bent and connected to the right side of the third steel wall 14. This arrangement forms a recessing part enclosed by the upper end of the fourth steel wall 21, the sixth steel wall 231, and the seventh steel wall 232, and a protruding part enclosed by the seventh steel wall 232, eighth steel wall 233, and ninth steel wall 234, allowing the upper end of the corner connector 04 to be securely clamped, preventing it from moving laterally. The sixth steel wall 231 and eighth steel wall 233 are preferably set horizontally, while the seventh steel wall 232 and ninth steel wall 234 are preferably set vertically, with the eighth steel wall 233 separated from the third steel wall 14.

Figures 8, 9:
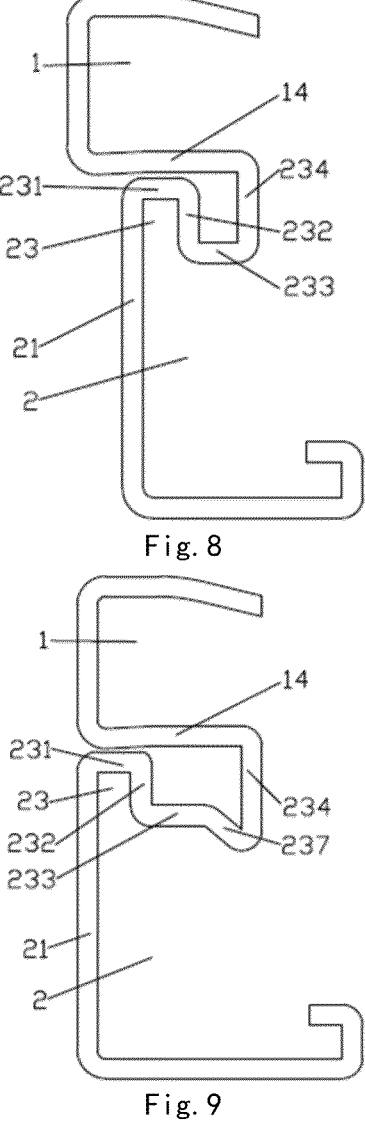
FIG. 8: A cross-sectional schematic of another steel frame strip in Scheme 3 of Embodiment 1.
FIG. 9: A cross-sectional schematic of another steel frame strip in Scheme 3 of Embodiment 1.

In particular, the sixth steel wall 231 may be set apart from the third steel wall 14 (as shown in FIG. 7); or, preferably, the sixth steel wall 231 engages with the lower left end of the third steel wall 14 (as shown in FIGS. 3-4, 6,

9-11) or underside of the center of the third steel wall 14 (as shown in FIG. 8) to provide support.

Figures 10, 11:
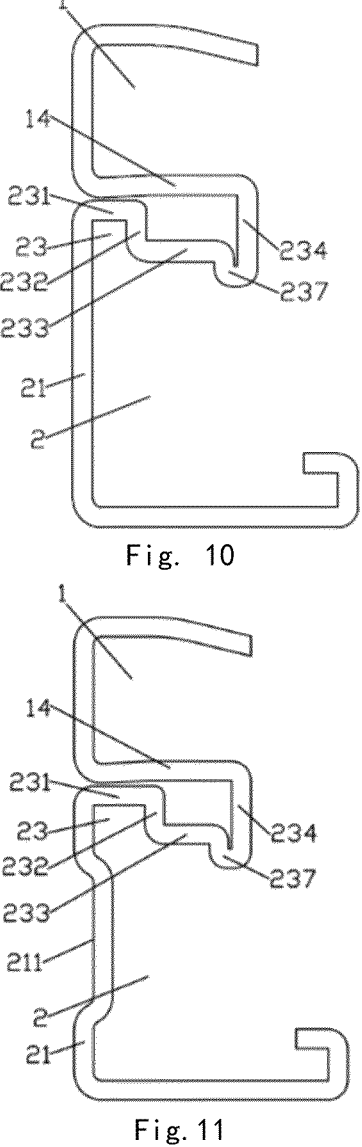
FIG. 10: A cross-sectional schematic of another steel frame strip in Scheme 3 of Embodiment 1.
FIG. 11: A cross-sectional schematic of another steel frame strip in Scheme 3 of Embodiment 1.
Figures 32, 33, 34:
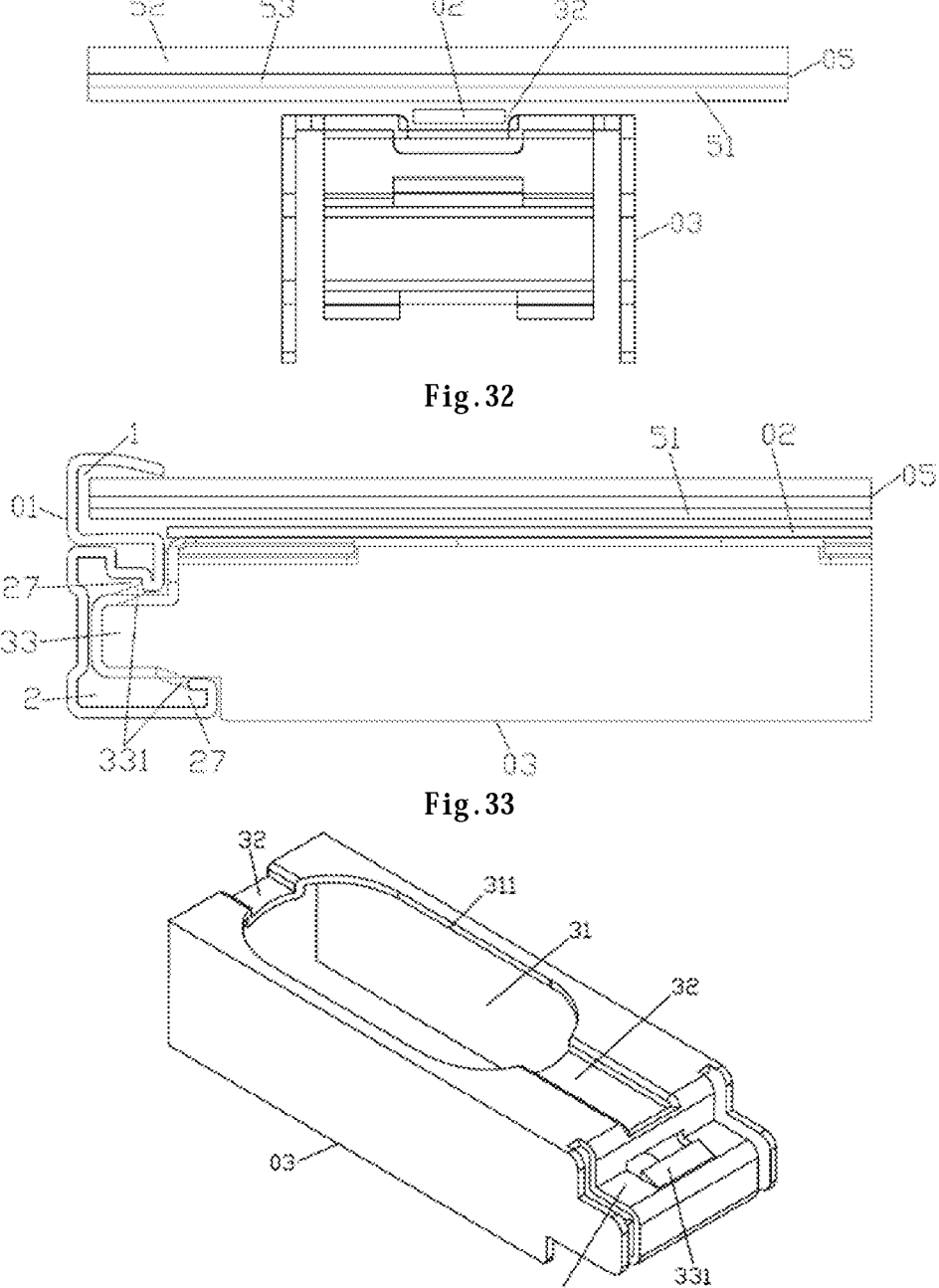
FIG. 32: A vertical sectional schematic of the installation structure of a cross bar with a photovoltaic laminate in Embodiment 1.
FIG. 33: A partial cross-sectional schematic of the left end of a photovoltaic module in Embodiment 1.
FIG. 34: A perspective schematic of the right end of a cross bar in Embodiment 1.

Specifically, the eighth steel wall 233 and ninth steel wall 234 may be directly bent and connected (as shown in FIGS. 6-8); or, alternatively, a second reinforcing rib 237, with a cross-section shaped as "\\" (as shown in FIG. 9) or "L" (as shown in FIGS. 10-11), may be bent and connected between the eighth steel wall 233 and the ninth steel wall 234. This second reinforcing rib 237 improves the mechanical strength of the protruding/recessing portion 23 and the entire steel frame strip 01, preventing deformation. Additionally, the eighth steel wall 233, second reinforcement rib 237, and ninth steel wall 234 form a new protruding/recessing portion, securing the upper end of the corner connector 04 more firmly and stably. This new protruding/recessing portion can also form a first slot 27 (as shown in FIG. 33) for installing other support components, such as cross bars 03.

Figures 12, 13:
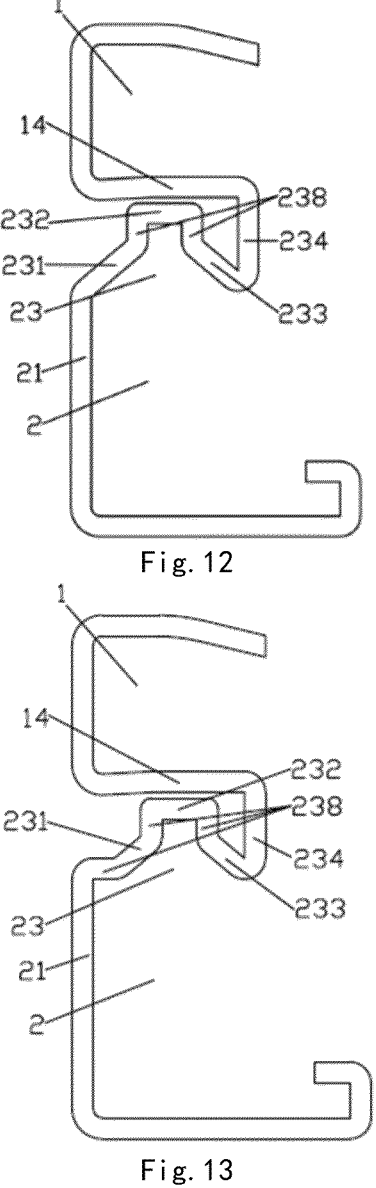
FIG. 12: A cross-sectional schematic of a steel frame strip in Scheme 4 of Embodiment 1.
FIG. 13: A cross-sectional schematic of another steel frame strip in Scheme 4 of Embodiment 1.

Design 4: Referring to FIGS. 12-13, the protruding/recessing portion 23 includes the sixth steel wall 231, seventh steel wall 232, eighth steel wall 233, and ninth steel wall 234. The sixth steel wall 231 slopes upward from left to right, while the eighth steel wall 233 slopes upward from right to left. The seventh steel wall 232 engages with the underside of the third steel wall 14. The left side of the seventh steel wall 232 is connected to the upper right end of the sixth steel wall 231; and the right side of the seventh steel wall 232 connected to the upper left end of the eighth steel wall 233. The upper left end of the sixth steel wall 231 is bent and connected to the upper end of the fourth steel wall 21, while the lower end of the ninth steel wall 234 is bent and connected to the lower right end of the eighth steel wall 233. The upper end of the ninth steel wall 234 is bent and connected to the right side of the third steel wall 14. This design creates a recessing part formed by the sixth steel wall 231, seventh steel wall 232, and eighth steel wall 233, and a protruding part formed by the eighth steel wall 233 and ninth steel wall 234, allowing the upper end of the corner connector 04 to be securely clamped, preventing it from moving laterally. The seventh steel wall 232 is preferably horizontal, the ninth steel wall 234 is vertical, and the sixth and eighth steel walls 231 and 233 are preferably set symmetrically.

Specifically, as shown in FIGS. 12-13, the sixth steel wall 231 and the eighth steel wall 233 each have a third reinforcing rib 238 set horizontally and/or vertically. This third reinforcing rib 238 strengthens the mechanical structure of the protruding/recessing portion 23 and the entire steel frame strip 01, preventing deformation, while also allowing the formation of a new protruding part on the left and right sides of the recessing part enclosed by the sixth, seventh, and eighth steel walls 231, 232, and 233. This design further stabilizes and secures the upper end of the corner connector 04.

Figures 14, 15:
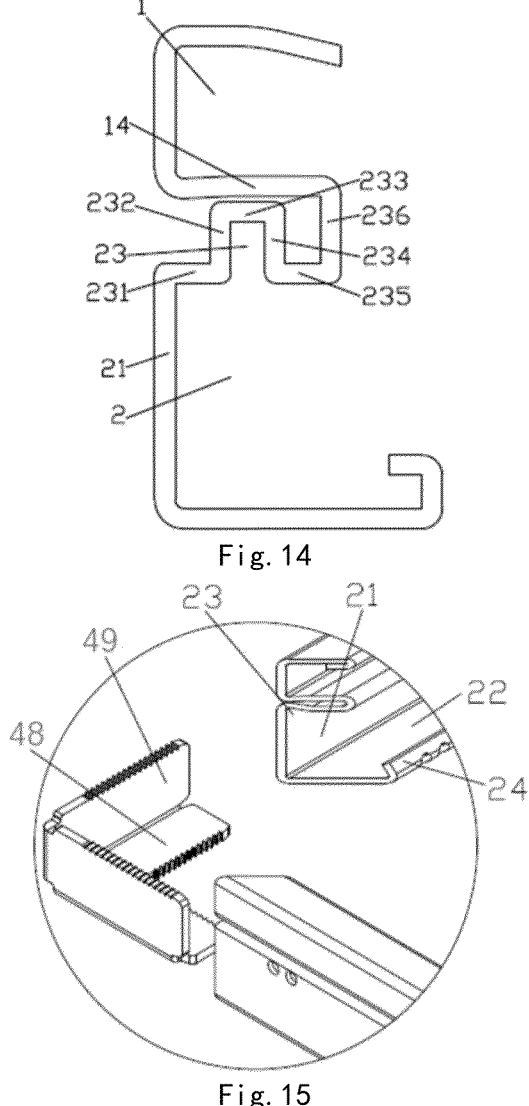
FIG. 14: A cross-sectional schematic of a steel frame strip in Scheme 5 of Embodiment 1.
FIG. 15: A partial enlarged view of the region labeled A1 in FIG. 1.

Design 5: Referring to FIG. 14, the protruding/recessing portion 23 includes the sixth steel wall 231, seventh steel wall 232, eighth steel wall 233, ninth steel wall 234, tenth steel wall 235, and eleventh steel wall 236. The eighth steel wall 233 engages with the underside of the third steel wall 14. The left side of the eight steel wall 233 bent and connected to the upper end of the seventh steel wall 232; and the right side of the eighth steel wall 233 is bent and connected to the upper end of the ninth steel wall 234. The left side of the sixth steel wall 231 is bent and connected to the upper end of the fourth steel wall 21, while the right side is bent and connected to the lower end of the seventh steel wall 232. The left side of the tenth steel wall 235 is bent and connected to the lower end of the ninth steel wall 234, and the right side of the tenth steel wall 235 is bent and connected to the lower end of the eleventh steel wall 236. The upper end of the eleventh steel wall 236 is bent and connected to the right side of the third steel wall 14. This configuration forms a recessing part enclosed by the seventh, eighth, and ninth steel walls 232, 233, and 234, with a protruding part on the left side formed by the sixth and seventh steel walls 231 and 232, and a protruding part on the right side of the recessing part formed by the ninth, tenth, and eleventh steel walls 234, 235, and 236. This arrangement secures the upper end of the corner connector 04, preventing it from moving laterally. The sixth, eighth, and tenth steel walls 231, 233, and 235 are preferably horizontal, while the seventh, ninth, and eleventh steel walls 232, 234, and 236 are vertical. Both the sixth and tenth steel walls 231 and 235 are set apart from the third steel wall 14.

Among the five designs for the protruding/recessing portion 23, Design 3 is preferred.

Referring to FIGS. 3-4, in the protruding/recessing portion 23, the eighth steel wall 233 is set separately from the third steel wall 14. This configuration allows a buffer chamber 25 to form between the protruding/recessing portion 23 and the right side of the third steel wall 14, with the buffer chamber 25 vertically aligned with the overflow prevention groove 152, meaning the overflow prevention groove 152 is positioned above the buffer chamber 25. This arrangement not only allows the overflow prevention groove 152 to provide good cushioning for the photovoltaic laminate 05, but the buffer chamber 25 also offers additional cushioning for the photovoltaic laminate 05. As a result, the combination of the buffer chamber 25 and the overflow prevention groove 152 greatly enhances the cushioning effect on the photovoltaic laminate 05, quickly and effectively dampening the wave force exerted by the vibrating photovoltaic laminate 05 on the steel frame strip; thus improving the sealing effect and durability of the photovoltaic module for long-term outdoor use, and enhancing the overall stability and reliability of the photovoltaic module in outdoor applications. Additionally, the left side of the sixth steel wall 231 partially engages with the lower left side of the third steel wall 14, engaging the protruding/recessing portion 23 with the left side of the third steel wall 14, thereby providing support to the third steel wall 14; and further improving the stability and reliability of the entire photovoltaic module for long-term outdoor use.

In practical applications, the fourth steel wall 21 is also provided with a fifth reinforcing rib 211 in the shape of bracket "]" formed by bending (as shown in FIGS. 4 and 11), enhancing the mechanical strength of the second mounting chamber 2 and the entire steel frame strip 01, preventing deformation of the fourth steel wall 21 and the entire steel frame strip 01.

Unlike traditional aluminum frames, the steel frame strip 01 in this example uses high-strength steel formed by cold bending and rolling, offering superior mechanical strength, structural stability, simpler manufacturing, and enhanced practicality.

Figures 16, 17:
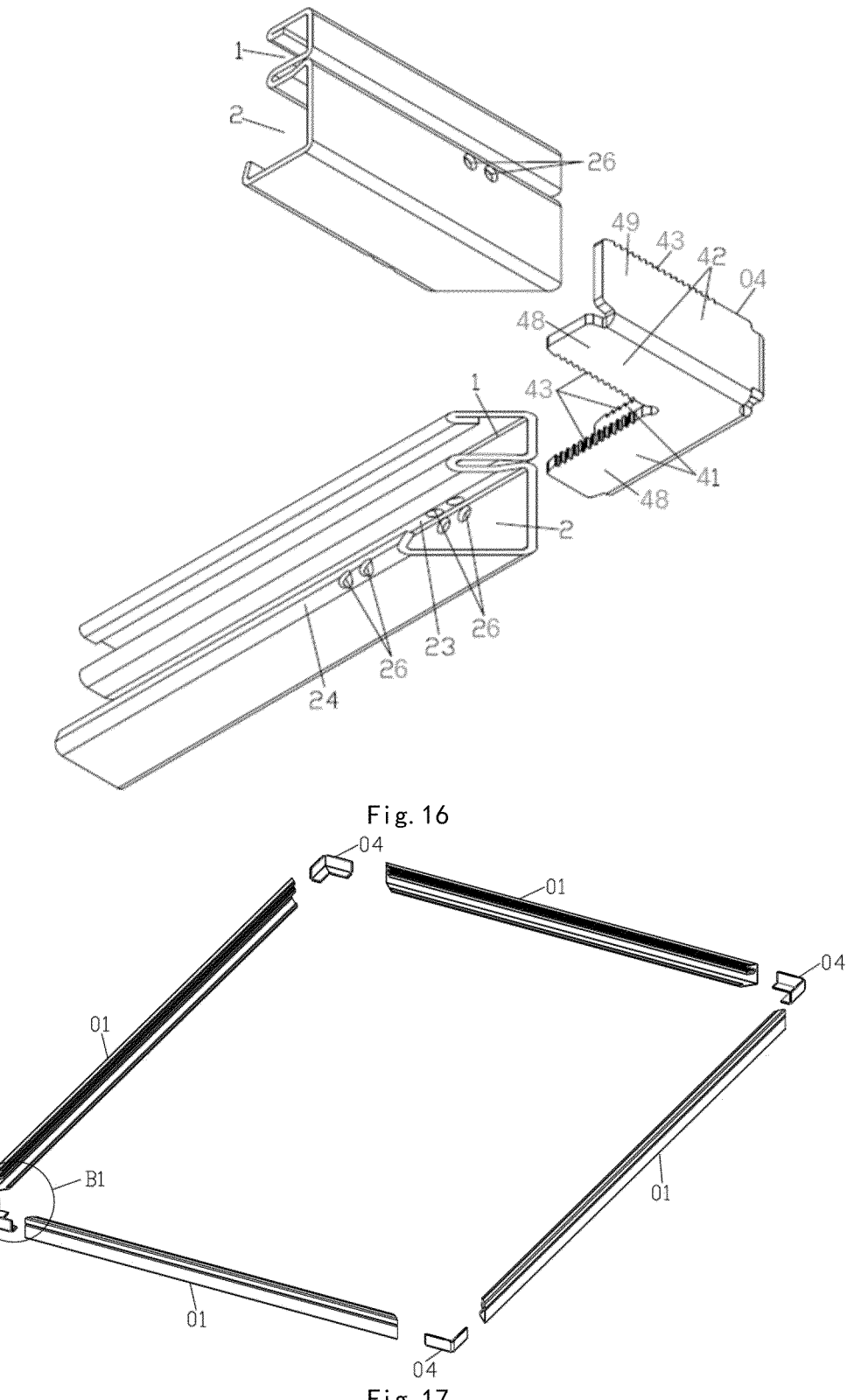
FIG. 16: An assembly schematic of a steel frame strip and corner connector in Embodiment 1.
FIG. 17: An exploded structural schematic of another photovoltaic frame in Embodiment 1.
Figures 18, 19:
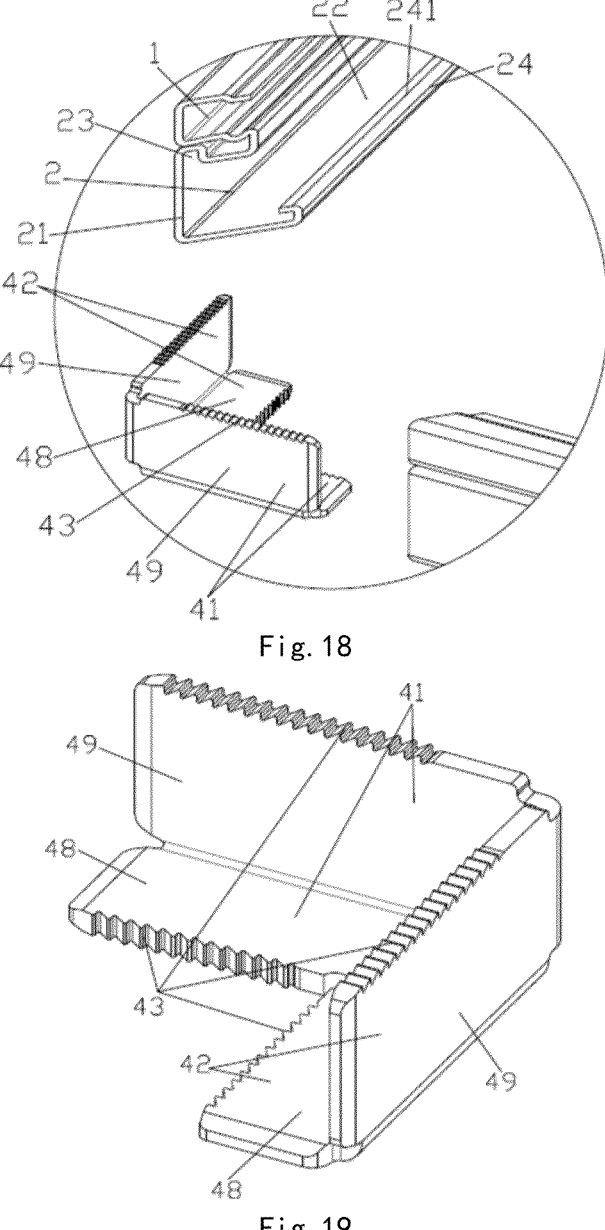
FIG. 18: A partial enlarged view of the region labeled B1 in FIG. 17.
FIG. 19: A perspective schematic of a corner connector in Embodiment 1.

In this example, the corner connector 04, as shown in FIGS. 16 and 19, includes a first connecting part 41 and a second connecting part 42, connected by bending. Referring to FIGS. 17-18, 20, and 24, the first connecting part 41 is mounted inside the second mounting chamber 2 of one steel frame strip 01 (e.g., a short steel frame strip 01B) at the corner, and the second connecting part 42 is mounted inside the second mounting chamber 2 of the other adjacent steel frame strip 01 (e.g., a long steel frame strip 01A) at the corner. This configuration connects the two adjacent steel frame strips 01 at the corner to form the photovoltaic frame. The corner connector 04 can also be used to connect adjacent long and short steel frame strips at corners in door or window frames.

Referring to FIGS. 18-21, the first connecting part 41 includes a first connecting wall 411 and a second connecting wall 412 joined by bending. In this example, the first connecting wall 411 is preferably a vertically positioned steel wall (i.e., vertical steel wall 49), while the second connecting wall 412 is preferably a horizontally positioned steel wall (i.e., horizontal steel wall 48). The top end of the vertical steel wall 49 clamps with the protruding/recessing portion 23, while the horizontal steel wall 48 clamps within the chamber enclosed by the lower end of the fourth steel wall 21, the fifth steel wall 22, and the bent section 24 (as shown in FIG. 15). Additionally, as shown in FIGS. 17-18, the vertical steel wall 49 closely fits against the vertical inner side wall of the second mounting chamber 2, and the horizontal steel wall 48 closely fits against the horizontal inner side wall of the second mounting chamber 2, thereby connecting the first connecting part 41 with one steel frame strip 01 at the corner.

Figures 20, 21:
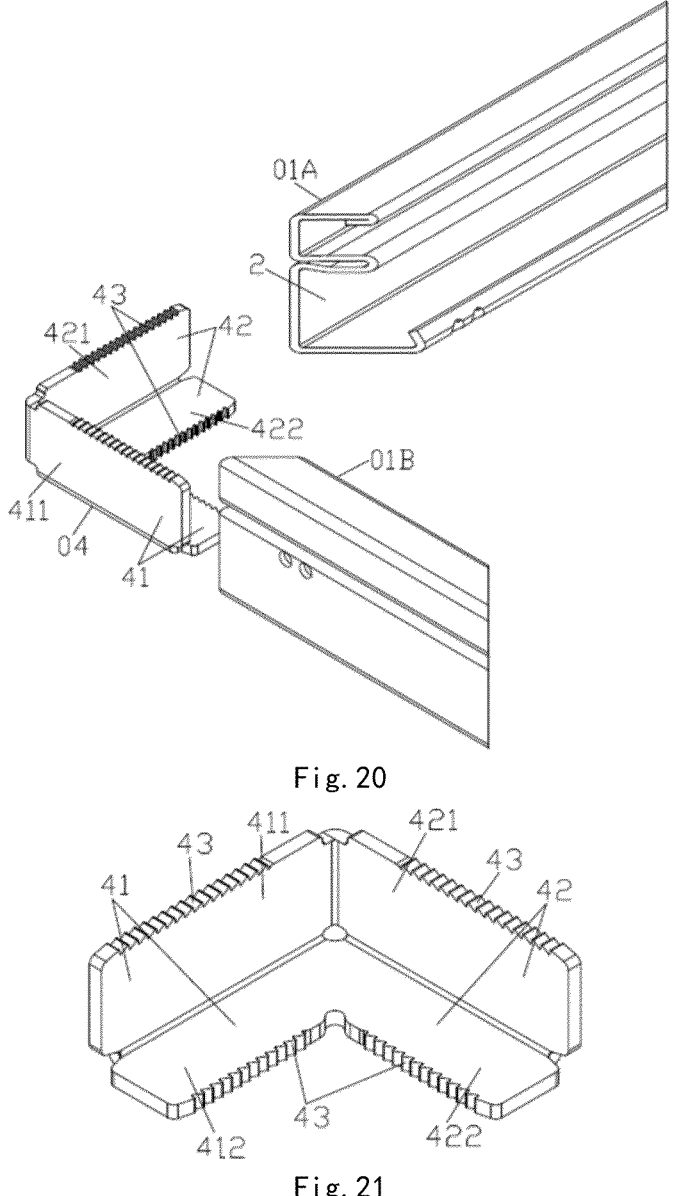
FIG. 20: An assembly schematic of a steel frame strip and corner connector from another viewing angle in Embodiment 1.
FIG. 21: A perspective schematic of a corner connector from another viewing angle in Embodiment 1.

As shown in FIGS. 16, 18, and 19, the free end of the horizontal steel wall 48 has a recess hole or protrusion, while the bent section 24 has a corresponding protrusion or recess hole 26 to engage with the recess or protrusion on the horizontal steel wall 48 (as shown in FIG. 16), increasing the fastening force between the horizontal steel wall 48 and the bent section 24. Furthermore, the free end of the vertical steel wall 49 also has a recess hole or protrusion, with the protruding/recessing portion 23 correspondingly having a protrusion or recess hole 26 to engage with the vertical steel wall 49 (as shown in FIG. 16), enhancing the fastening force between the vertical steel wall 49 and the protruding/recessing portion 23. The protrusions at the free ends of the horizontal steel wall 48 and the vertical steel wall 49 are preferably provided with a serrated structure 43. Specifically, as shown in FIGS. 20-21, the outer edge of the first connecting wall 411 and/or the second connecting wall 412 is provided with serrated structure 43. Preferably, both the outer edges of the first connecting wall 411 and the second connecting wall 412 have the serrated structure 43. The serrated structure 43 effectively increases the frictional resistance and fastening force between the outer edges of the first and second connecting walls 411 and 412 and the inner side walls of the second mounting chamber 2 in the adjacent steel frame strip 01 at the corner, securing the connection of the first connecting section 41 with the steel frame strip 01 at the corner.

In this embodiment, it is preferred that the upper edge of the first connecting wall 411 and the right edge of the second connecting wall 412 are both provided with the serrated structure 43. This configuration ensures a secure connection of the first connecting section 41 with the steel frame strip 01 at the corner without requiring the serrated structure 43 on multiple outer edges of the first and/or second connecting walls 411 and 412, simplifying the structure and reducing the production cost of the serrated structure 43.

Referring to FIGS. 18-21, the second connecting part 42 includes a third connecting wall 421 and a fourth connecting wall 422 joined by bending. In this embodiment, the third connecting wall 421 is preferably a vertically positioned steel wall (i.e., vertical steel wall 49), while the fourth connecting wall 422 is preferably a horizontally positioned steel wall (i.e., horizontal steel wall 48). The connection of the second connecting part 42 with the adjacent steel frame strip 01 at the corner follows the same principles as the connection of the first connecting part 41, and thus, it will not be elaborated further.

Specifically, as shown in FIGS. 20-21, the outer edges of the third connecting wall 421 and/or the fourth connecting wall 422 are provided with a serrated structure 43. Ideally, both the outer edges of the third connecting wall 421 and the fourth connecting wall 422 are provided with serrated structures 43. The serrated structure 43 effectively increases the friction and fastening strength between the outer edges of the third and fourth connecting walls 421, 422 and the inner sidewalls of the second mounting chamber 2 on the adjacent steel frame strip 01 at the corner. This enables a stable and secure connection of the second connecting part 42 with the adjoining steel frame strip 01 at the corner.

In this design, it is preferable that both the upper edge of the third connecting wall 421 and the front edge of the fourth connecting wall 422 are provided with the serrated structure 43. This ensures a firm connection between the second connecting part 42 and the adjacent steel frame strip 01, while also simplifying the structure and reducing the cost of manufacturing the serrated structure 43.

Further, as illustrated in FIGS. 25-29, the serrated structure 43 comprises multiple first reversed teeth 431 angled outward from the corner connector 04 and several second reversed teeth 432 angled inward from the corner connector 04. These first and second reverse teeth 431, 432 are alternately arranged, allowing the tooth tips 433 on the free ends of adjacent first and second reversed teeth to face different directions on the corner connector 04. This configuration ensures that each tooth tip 433 on either side can engage securely with different interior sidewalls of the second mounting chamber 2 on the steel frame strip 01. Therefore, even if the inner walls of the second mounting chamber 2 are manufactured with slight dimensional deviations, the connection stability between the serrated structure 43 and the sidewalls of the second mounting chamber 2 remains uncompromised. This setup not only ensures a stable and secure connection but also reduces the precision required in manufacturing the steel frame strips 01 and corner connectors 04, thereby improving pass rates and reducing processing costs.

In particular, both the first reversed teeth 431 and second reversed teeth 432 have triangular cross-sections and quadrilateral longitudinal sections.

Figures 26, 27, 28:
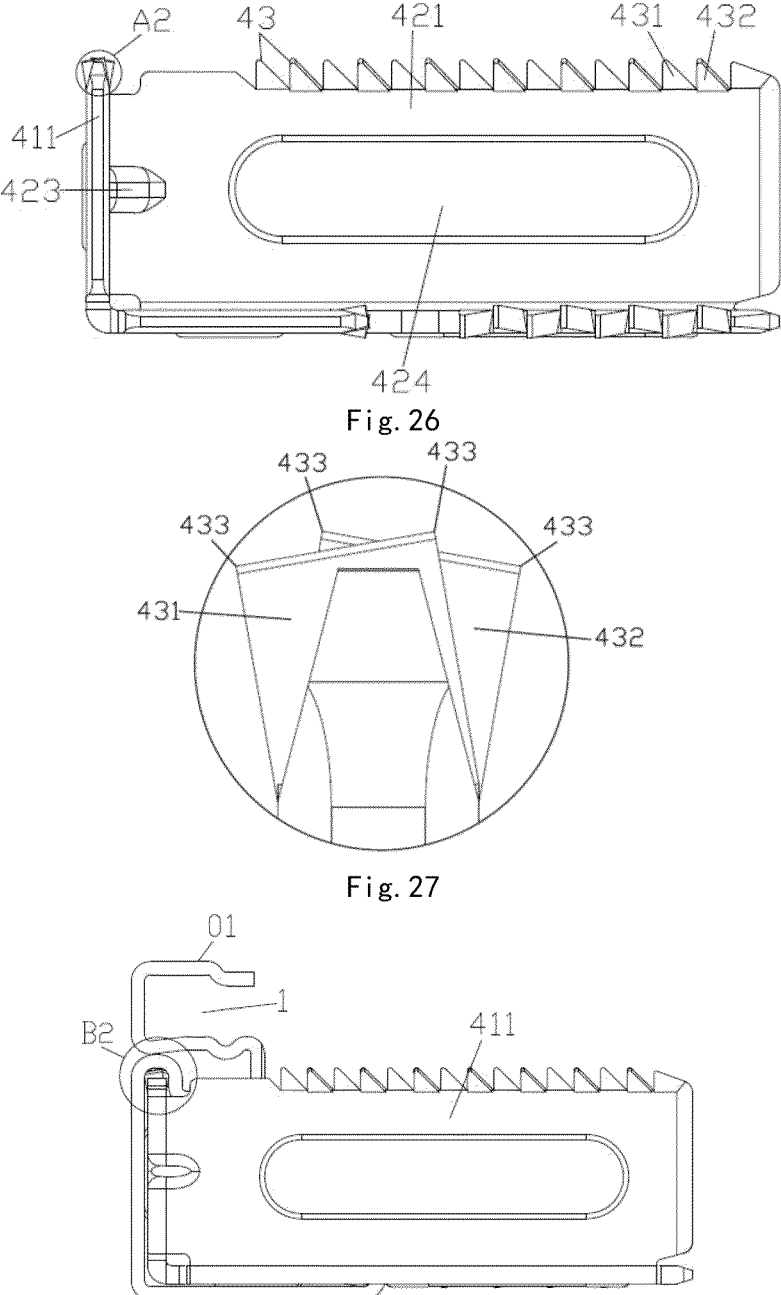
FIG. 26: A front view of a corner connector in Embodiment 1.
FIG. 27: A partial enlarged view of the area labeled A2 in FIG. 26.
FIG. 28: A schematic of the installation structure of the second connecting portion of the corner connector with the second mounting chamber of the steel frame strip in Embodiment 1.

Preferably, the first reverse teeth 431 incline outward from the corner connector 04 at an angle of 1-80 degrees, which can be specified as 1, 5, 10, 20, 30, 50, 60, 70, or 80 degrees; while the second reversed teeth 432 incline inward at an angle of 1-80 degrees (as shown in FIG. 27). If the inclination angles of the first and second reversed teeth 431 and 432 are too small, the secure connection between the serrated structure 43 and the inner walls of the second mounting chamber 2 would be compromised. On the other hand, if the angles are too large, the second mounting chamber 2 would require a larger space to accommodate the serrated structure 43, increasing both manufacturing and material costs.

Additionally, for each row of serrated structures 43, the angle of inclination of the first reversed teeth 431 and the second reversed teeth 432 can either be uniform or vary. This flexibility allows each row of serrated structures 43 to establish a firm and stable connection with the inner walls of the second mounting chamber 2 from at least four different directions. When the inclination angles of the first and second reversed teeth differ within each row, the serrated structure 43 can connect with the second mounting chamber 2 from even more than four directions, further enhancing its stability.

Preferably, as illustrated in FIGS. 26-27, on both free ends of the first reversed teeth 431, the tooth tips 433 are inclined downward outward and upward inward from the corner connector 04. On both free ends of the second reversed teeth 432, the tooth tips 433 are inclined downward inward and upward outward from the corner connector 04.

Figures 24, 25:
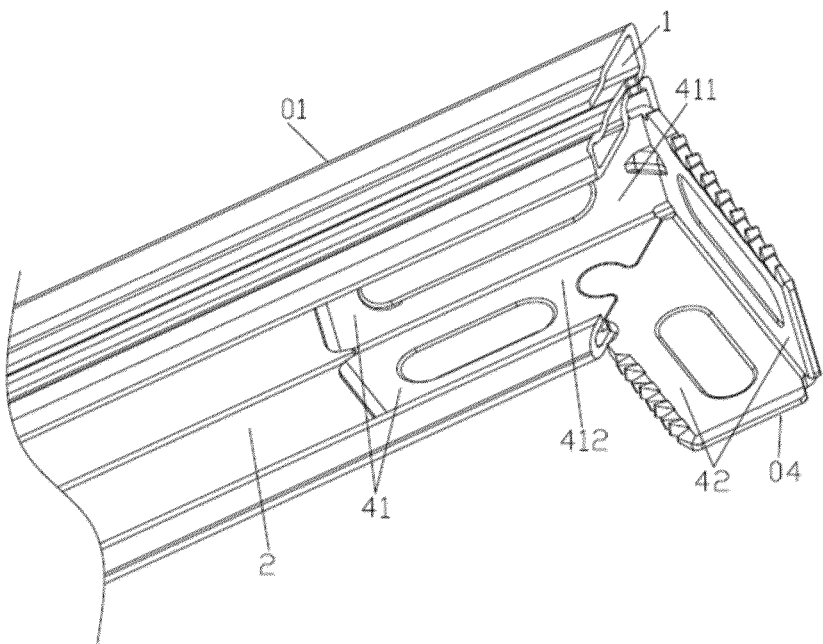
FIG. 24: A perspective schematic showing the installed structure of the first connecting part of the corner connector with the second mounting chamber of the steel frame strip in Embodiment 1.
FIG. 25: A perspective schematic of a corner connector in Embodiment 1.

In this embodiment, as shown in FIGS. 25-27, using the serrated structure 43 on the upper edge of the first connecting wall 411 as an example, the serrated structure 43 comprises several first reversed teeth 431 angled to the left and several second reversed teeth 432 angled to the right. The first reversed teeth 431 and the second reversed teeth 432 are arranged alternatively. The first reversed teeth 431 is inclined left toward the first connecting wall 411 at an angle of 1-80 degrees. The second reversed teeth 431 is inclined right toward the first connecting wall 411 at an angle of 1-80 degrees. Both the first reversed teeth 431 and second reversed teeth 432 have triangular cross-sections. (Respectively, the first and second reversed teeth 431 and 432 are triangular viewed from the left and right side). In addition, the first reversed teeth 431 and second reversed teeth 432 have quadrilateral longitudinal sections. (Respectively, the first and second reversed teeth 431 and 432 are quadrilateral viewed from along the front-to-end side). As a result, when viewing along the front-to-end side, the left-side tip of each first reversed tooth 431 inclines leftward and downward, while the right-side tip inclines rightward and upward; Moreover, from the front view, the right-side tooth tip 433 of the first reversed tooth 431 is staggered with the left-side tooth tip 433 of the second reversed tooth 432, and similarly, the left-side tooth tip 433 of the first reversed tooth 431 is staggered with the right-side tooth tip 433 of the second reversed tooth 432. Thus, from the front view, the adjacent first and second reversed teeth 431 and 432 form a total of four staggered tooth tips 433, each pointing in different directions. These four staggered tooth tips 433 can establish a stable and secure engagement with different inner walls of the second mounting chamber 2 from four different directions.

In existing corner connectors, the free ends of the teeth structures in the serrated pattern are not inclined towards the left or right side. Consequently, the serrated structure of existing corner connectors only allows for two tooth tips to securely engage with the inner left and right walls of the second mounting chamber, requiring high precision in the machining of the chamber. Otherwise, the connection between the serrated structure and the inner wall of the second mounting chamber can become loose or even fail to secure.

In contrast, in this embodiment (see FIGS. 28-29), even if there is some machining deviation in the dimensions of the second mounting chamber 2 that prevents certain free tooth tips 433 from securely connecting to the corresponding inner walls of the chamber, the remaining two or three free tooth tips 433 can still achieve a stable connection with the chamber's inner walls. This design ensures a secure and stable connection between the serrated structure 43 and the inner walls of the second mounting chamber 2 while lowering the machining precision requirements for connecting the corner connector 04 to the steel frame strip 01. This improves production yield and reduces processing costs.

Specifically, the serrated structure 43 is a reversed teeth structure, meaning the free ends of the teeth in the serrated structure 43 incline towards the corner connection side of the first connecting part 41 and the second connecting part 42. This prevents the corner connector 04 from sliding out of the second mounting chamber 2 of the steel frame strip 01, thus ensuring a more secure connection. In practice, the serrated structure 43 can be configured such that each tooth is perpendicular to its inner edge on one side. Alternatively, the sides of each tooth in the serrated structure 43 can form acute angles with the inner edge, with each of the two teeth with different acute angles to ensure the reverse tooth structure.

Similar to the steel frame strip 01, the preferred material for the corner connector 04 is steel, making this photovoltaic frame a steel-made photovoltaic frame (referred to as a steel frame). Compared to aluminum, which has a thermal expansion coefficient of 23.2, steel's thermal expansion coefficient of 13 is closer to glass's coefficient of 8.5. This makes steel frames safer in the cyclic heating and cooling conditions faced by photovoltaic modules. Additionally, because the deflection of steel frames is one-third that of aluminum frames and the solar cells in photovoltaic laminates 05 are becoming increasingly thin, the risk of microcracks under equivalent snow and wind loads is significantly reduced in steel-framed photovoltaic modules compared to those with aluminum frames.

Figures 22, 23:
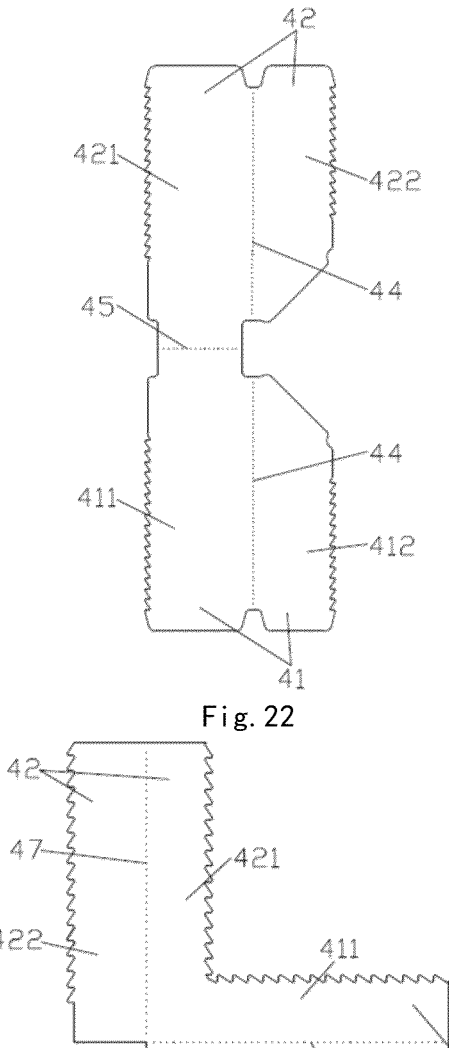
FIG. 22: A flat unfolded view of a corner connector in Embodiment 1.
FIG. 23: A flat unfolded view of a corner connector in Embodiment 2.

Refer to FIG. 22, where the first connecting wall 411 and the third connecting wall 421 are integrally formed, or the second connecting wall 412 and the fourth connecting wall 422 are integrally formed. Thus, the first connecting part 41 and the second connecting part 42 of the corner connector 04 are integrally connected, providing greater stability and durability compared to the interlocking protrusions and grooves in existing steel corner connectors.

Furthermore, unlike existing steel corner connectors, the corner connector 04 only requires the four side walls, first connecting wall 411, second connecting wall 412, third connecting wall 421, and fourth connecting wall 422, without needing additional protrusions and grooves on the connector body for interlocking its upper surfaces. This reduces material usage and simplifies the production process, lowering the production costs of corner connector 04.

In this embodiment, as shown in FIG. 21, the plane of the first connecting wall 411 intersects with the plane of the third connecting wall 421, while the second connecting wall 412 and the fourth connecting wall 422 lie on the same plane. The angle between at least one pair—either between the first connecting wall 411 and the third connecting wall 421 or between the second connecting wall 412 and the fourth connecting wall 422—is 90 degrees. See FIGS. 21-22 for the one-piece structure formed by bending the first connecting wall 411 and the third connecting wall 421.

Specifically, at the bending connection between the first connecting wall 411 and the third connecting wall 421, a first reinforcing rib 423 is added (see FIGS. 25, 26, and 30) to enhance the bending connection and prevent deformation, thereby maintaining structural stability.

Figures 29, 30, 31:
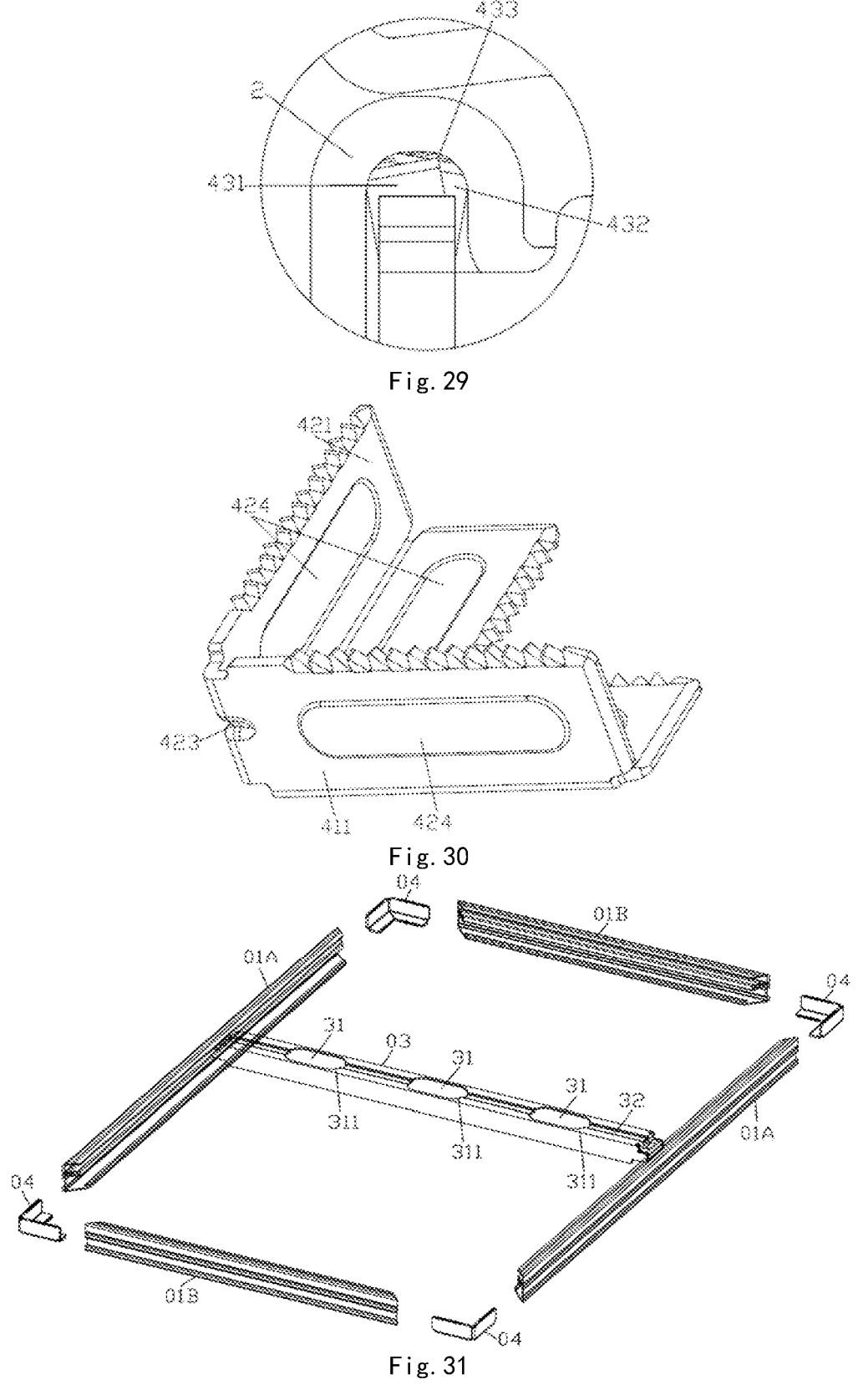
FIG. 29: A partial enlarged view of the area labeled B2 in FIG. 28.
FIG. 30: A perspective schematic of a corner connector in this embodiment from another viewing angle.
FIG. 31: An exploded schematic of a photovoltaic frame with a cross bar in Embodiment 1.

As shown in FIGS. 25-26 and 30, it is preferred that the wall surfaces of the first connecting wall 411, second connecting wall 412, third connecting wall 421, and fourth connecting wall 422 have an additional sixth reinforcing rib 424 formed by bending, further increasing the mechanical strength of the entire corner connector 04 to prevent deformation.

In this embodiment, specifically, the second connection wall 412 and the fourth connection wall 422 are connected by interlocking, welding, or snap-fitting.

When the connection between the second connecting wall 412 and the fourth connecting wall 422 is a snap-fit, in one example of this embodiment (see FIG. 25), the connecting side of the second connecting wall 412 has a second slot 4121, while the corresponding connecting side of the fourth connecting wall 422 has a matching second locking block 4221. In another example of this embodiment, the connecting side of the second connecting wall 412 has a locking block, while the corresponding connecting side of the fourth connecting wall 422 has a matching slot. In this way, by snapping the second locking block 4221 into the second slot 4121, the second connecting wall 412 and the fourth connecting wall 422 are securely connected.

Additionally, the second locking block 4221 includes a snapping section and a connecting section, with the snapping section having a maximum width greater than the connecting section. The free end of the second locking block 4221 (i.e., the free end of the snapping section) is arc-shaped. This design reduces resistance force when snapping the free end of the second locking block 4221 into the second slot 4121, making the snap-fit process smoother and enhancing stability and firmness after snapping to prevent the second locking block 4221 from disengaging from the second slot 4121.

The manufacturing process for the corner connector 04 described in this embodiment is as follows:

First, a steel plate is cut into the shape shown in FIG. 22. The steel plate is bent along the first bend line 44 in the vertical direction, and then bent again along the second bend line 45 in the horizontal direction. Finally, the second connecting wall 412 and the fourth connecting wall 422 are interlocked, welded, or snap-fitted with each other to complete the corner connector 04. This corner connector 04 is a single-piece structure made from steel plate through cutting and bending, simplifying the manufacturing process compared to existing steel corner connectors, which require multiple steps such as bending, splitting, hole punching, and surface treatment. This simpler process further reduces production costs.

The preferred thickness of the steel plate is 1-3 mm to ensure the mechanical strength of the corner connector 04. The steel plate is either corrosion-resistant steel or stainless steel, providing not only high strength but also excellent corrosion resistance, meeting the requirements for long-term outdoor use.

In this embodiment, another type of photovoltaic frame in this embodiment (see FIGS. 31-32) includes a frame and a cross bar 03. The frame comprises multiple steel frame strips 01 and corner connectors 04 that connect adjacent steel frame strips 01. This frame is one of the photovoltaic frames described in the embodiment above, where the steel frame strips 01 are fixed around the perimeter of the photovoltaic laminate 05. The cross bar 03 is attached to the back of the photovoltaic laminate 05, and the ends of the cross bar 03 snap-fit with the steel frame strips 01.

In practical application (see FIGS. 31-32), there are multiple steel frame strips 01, with each strip secured along one side of the photovoltaic laminate 05. For example, if the photovoltaic laminate 05 is a rectangular structure with four sides, then each side is fitted with one steel frame strip 01, totaling four steel frame strips 01.

As shown in FIGS. 32-33, the top surface of the cross bar 03 is adhered to the back of the photovoltaic laminate 05. This allows the cross bar 03 to provide mechanical support to the back of the photovoltaic laminate 05. Therefore, the combination of steel frame strips 01 and cross bar 03 enhances the mechanical strength of the entire photovoltaic module. The preferred material for the cross bar 03 is steel, which can be easily fabricated through cutting and cold bending. Compared to traditional aluminum frames, steel offers greater strength, further reinforcing the entire photovoltaic module. Specifically, the top surface of the cross bar 03 adheres to the back of the photovoltaic laminate's back panel 51.

Additionally, the top surface of the cross bar 03 is adhered to the back of the photovoltaic laminate 05 through the adhesive layer 02. Preferably, the top surface of the cross bar 03 includes a groove 32 to hold the adhesive layer 02 (see FIGS. 31-32). Limiting the adhesive layer 02 within the groove 32 not only prevents it from shifting under external forces, making the bonding process between the cross bar 03 and photovoltaic laminate 05 easier and more precise, but also protects the adhesive from exposing to air, which could lead to aging and detachment.

Figure 36:
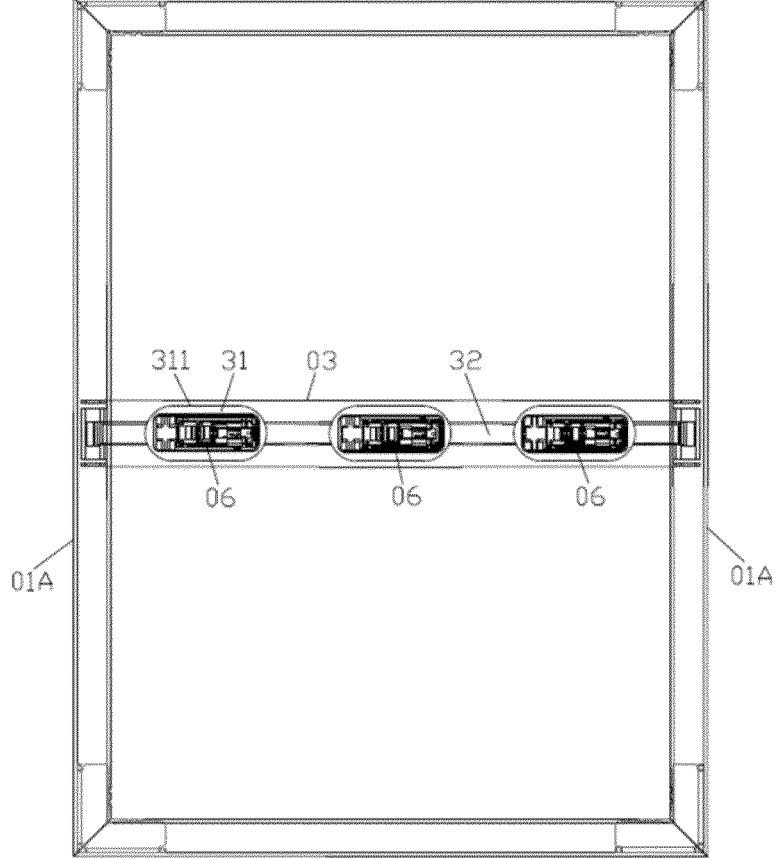
FIG. 36: A top view of a photovoltaic frame with a cross bar after the junction box installed in Embodiment 1.
Figures 37, 38, 39:
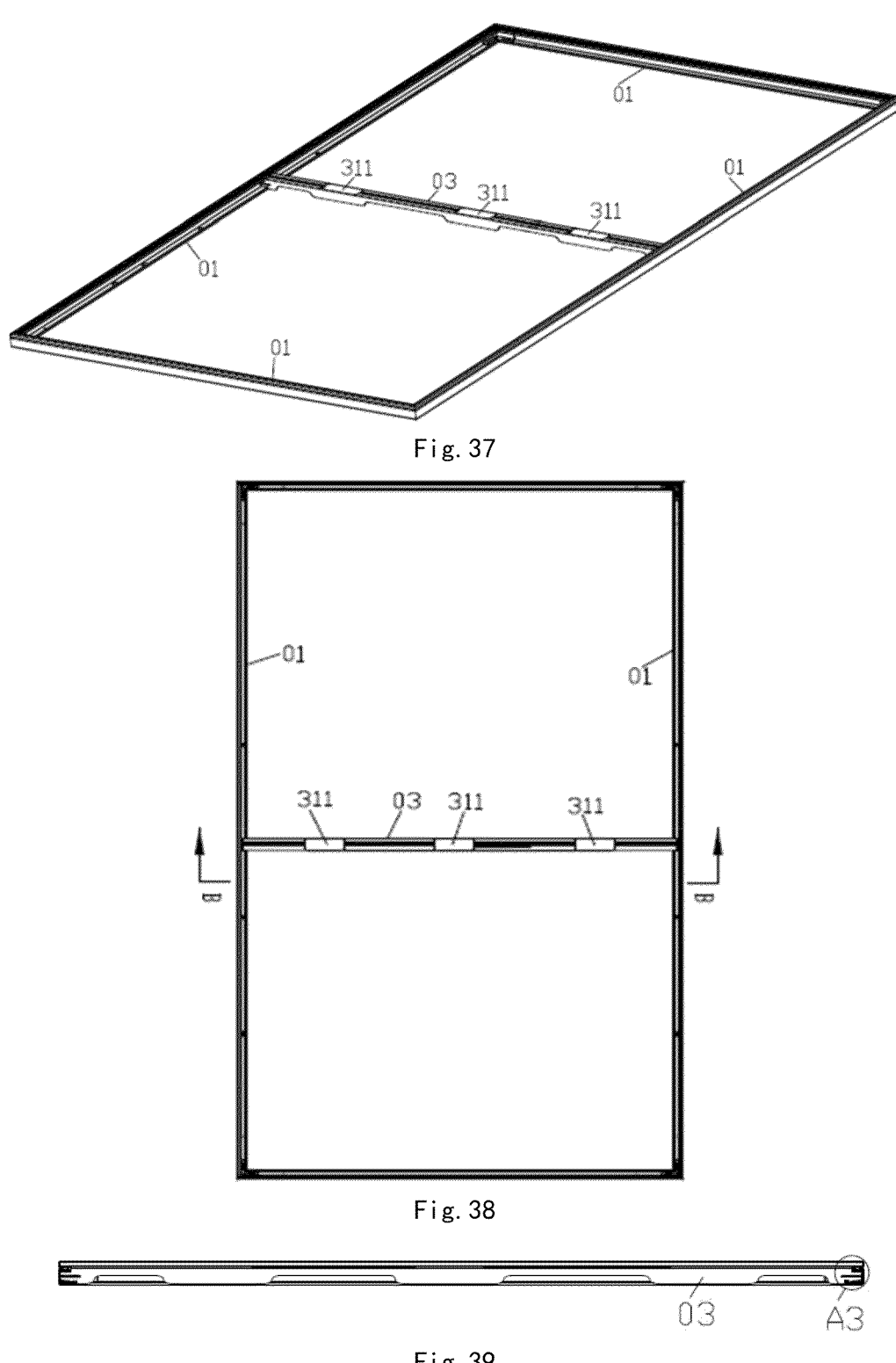
FIG. 37: A perspective schematic of a photovoltaic frame in Embodiment 1.
FIG. 38: A top view of a photovoltaic frame in Embodiment 1.
FIG. 39: A sectional schematic at section B-B of FIG. 38.

In one example of this embodiment, the groove 32 may be positioned in the center of the top surface of the cross bar 03 (see FIGS. 31-32, 36). In other examples, the groove 32 can be located along the front and rear edges of the top surface of the cross bar 03 (see FIG. 51).

Furthermore, as shown in FIGS. 31-32, the groove 32 runs along the length of the cross bar 03, extending through both ends. This design increases the bonding area between the adhesive layer 02 within the groove 32 and the back of the photovoltaic laminate 05, enhancing the adhesion strength. The preferred adhesive layer 02 is a structural adhesive, chosen for its high strength, durability, and load-bearing capacity, which prolongs the bond's longevity and provides additional mechanical support for the photovoltaic laminate 05.

In FIG. 31, the cross bar 03 is installed at the center of the steel frame strips 01, not at their ends. The cross bar 03 can be attached to the steel frame strips 01 using various methods such as bonding, screwing, snap-fitting, or a combination of these. The preferred attachment is snap-fitting where both ends of the cross bar 03 respectively snap-fit with the center of left and right steel frame strips 01 (e.g., the two opposing long frame strips 01A). Compared to bonding or screwing, snap-fitting simplifies and accelerates the assembly process and ensures that the cross bar 03 and steel frame strips 01 are detachable, facilitating repair or replacement of the cross bar 03 or steel frame strips 01.

Figures 40, 41, 42:
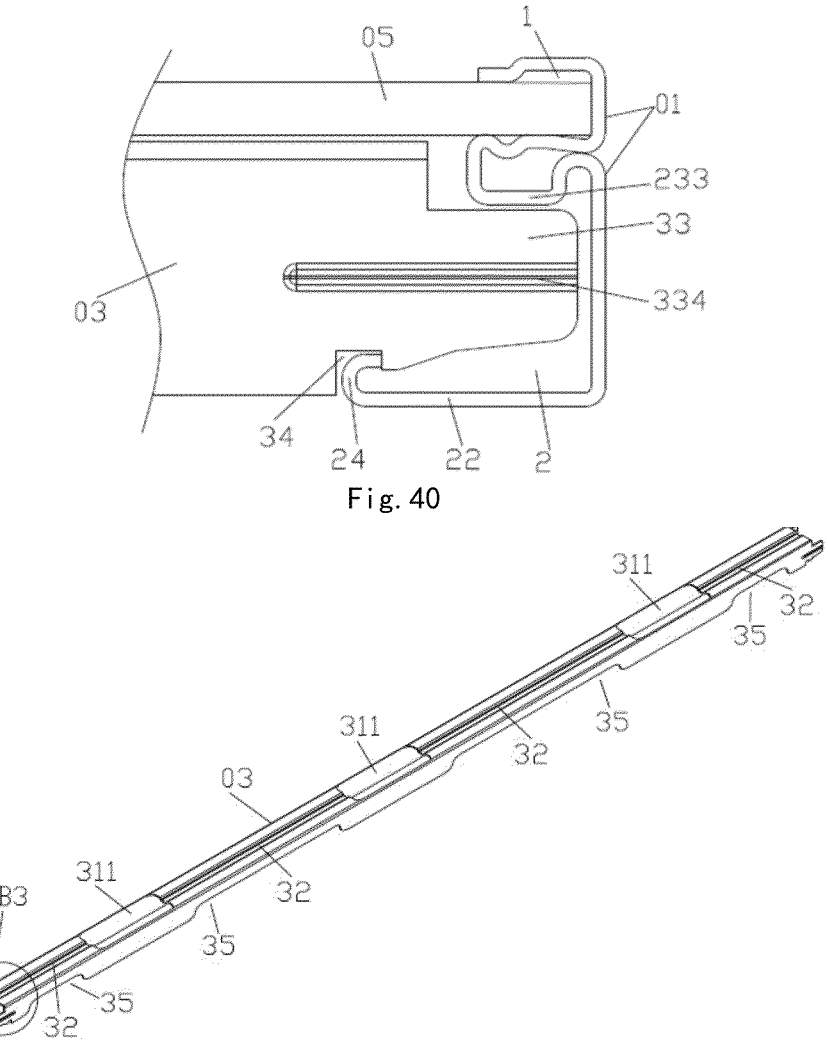
FIG. 40: An enlarged view of the partial structure labeled A3 in FIG. 39.
FIG. 41: A perspective schematic of a cross bar within a photovoltaic frame in Embodiment 1.
FIG. 42: An enlarged view of the section labeled B3 in FIG. 41.

As shown in FIGS. 33 and 40, the ends of the cross bar 03 are equipped with mounting sections 33, extending outward along its length, which can be inserted into the second mounting chamber 2 of the steel frame strips 01. This embodiment offers two different snap-fit methods between the cross bar 03 and steel frame strips 01, each involving distinct snap-fit structures, as described in detail below:

The following describes the first type of snap-fit structure and method for connecting the cross bar 03 with the steel frame strips 01 (as shown in FIGS. 31-35):

Referring to FIG. 33, the surface of the mounting section 33 has an outwardly protruding first locking block 331. Inside the second mounting chamber 2, there is a first slot 27 that engages with the first locking block 331. After inserting the mounting section 33 into the second mounting chamber 2, the snap-fit engagement between the first locking block 331 and the first slot 27 ensures the stability of the snap-fit connection between the cross bar 03 and the steel frame strip 01.

In other examples of this embodiment, the long frame strip 01A may include the first locking block 331, with corresponding first slots 27 located at both ends of the cross bar 03. This setup allows each end of the cross bar 03 to snap-fit with the two long frame strips 01A.

20

Figure 35:
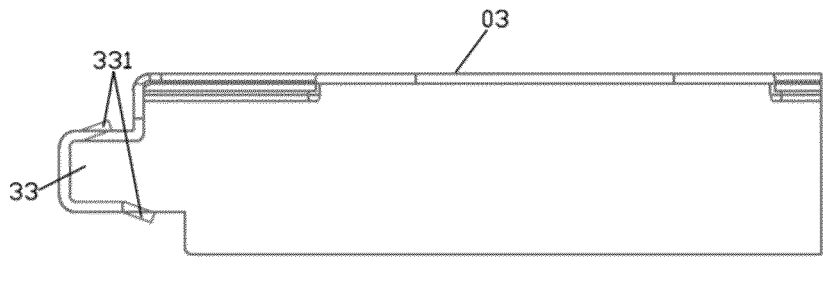
FIG. 35: A front view of the left end of a cross bar in Embodiment 1.

In practice (as shown in FIGS. 33-35), the mounting section 33 is preferably an integral structure with the end of the cross bar 03, providing a more stable and secure connection. The height of the mounting section 33 is less than the height of the cross bar 03; the top surface of the mounting section 33 is positioned lower than that of the cross bar 03, and the bottom surface of mounting section 33 is positioned lower than that of the cross bar 03 as well. This design facilitates quick and easy insertion of the mounting section 33 into the second mounting chamber 2 of the steel frame strip 01. After the mounting section 33 is inserted into the second mounting chamber 2 and the side of the photovoltaic laminate 05 is sealed within the first mounting chamber 1, the top surface of the cross bar 03 makes contact with the back of the photovoltaic laminate 05, providing mechanical support.

Furthermore, the fixed end of the first locking block 331 is integrally connected to the surface of the mounting section 33, where a portion of the mounting section 33 is cut and bent outward to form the free end of the first locking block 331. This method uses the material of the mounting section 33 itself to form the first locking block 331, thus saving materials. Because the fixed end of the first locking block 331 is integrally connected to the mounting section 33's surface, this design also enhances the stability and strength of their connection. In practice, both the mounting section 33 and the cross bar 03 are made from steel with high strength, ductility, and cold-bending properties. After cutting, the steel's cold-bending property allows the free end of the first locking block 331 to protrude outward, completing the processing of the first locking block 331 in a simpler, more efficient way. Once the first locking block 331 snaps into the first slot 27, the cold-bending properties and ductility of the steel allow the free end of the first locking block 331 to move closer to the surface of the mounting section 33, making it easier to disassemble the first locking block 331 and the first slot 27. The high strength of steel also ensures the stability of the snap-fit connection between the first locking block 331 and the first slot 27.

Furthermore, the top surface of the mounting section 33 has an upward-protruding first locking block 331, while the bottom surface has a downward-protruding first locking block 331. Both the upper and lower parts of the second mounting chamber 2 have first slots 27 that engage with the first locking blocks 331 on the mounting section 33's top and bottom surfaces, which further enhances the stability and strength of the snap-fit connection between the cross bar 03 and the steel frame strip 01.

Additionally, the fixed end of the first locking block 331 is positioned near the end of the mounting section 33, while the free end of the first locking block 331 is closer to the end of the cross bar 03. For instance, for the mounting section 33 on the left end of the cross bar 03, the fixed ends of the top and bottom first locking blocks 331 are located on the left side of the mounting section 33. The free end of the top first locking block 331 inclines upward from left to right, while the free end of the bottom first locking block 331 inclines downward from left to right. Similarly, for the mounting section 33 at the right end of the cross bar 03, the fixed ends of the top and bottom first locking blocks 331 are positioned at the right end of the mounting section 33. The free end of the top first locking block 331 inclines upward from right to left, while the free end of the bottom first locking block 331 inclines downward from right to left. With the free ends inclining in opposite directions, the first locking blocks 331 form a reverse tooth structure. This design improves the ease of assembly and helps prevent the first locking blocks 331 from disengaging from the first slot 27, making the snap-fit more secure.

The second type of snap-fit connection structure and method for the cross bar 03 and steel frame strip 01 (as shown in FIGS. 37-45) is as follows:

Referring to FIG. 40, the free end of the fifth steel wall 22 of the mounting chamber is bent upwards and then folded inwards to form the bent section 24. The cross bar's 03 bottom near the mounting section 33 of is provided with a third slot 34.

As shown in FIGS. 40-42, during the installation of the cross bar 03 and steel frame strip 01, the free end of the mounting section 33 is first inserted into the second mounting chamber 2. The top part of the bent section 24 is then snapped into the third slot 34 at the bottom of the cross bar 03, restricting lateral movement of the cross bar 03. Next, an adhesive is injected into the groove 32 on the top of the cross bar 03, bonding the top surface of the cross bar 03 to the back of the photovoltaic laminate 05 after curing. This completes the installation, ensuring a stable connection between the cross bar 03 and the steel frame strip 01, with a simple and efficient assembly process.

On one hand, the bent section 24 is engaged with the third slot 34 at the bottom of the cross bar 03, restricting lateral movement and preventing the mounting section 33 of the cross bar 03 from shifting out of the second mounting chamber 2 of the steel frame strip 01. On the other hand, the bent section 24 which formed by bending, further enhances the mechanical strength of itself and the second mounting chamber 2, preventing deformation of the second mounting chamber 2 from affecting the fit between the mounting section 33 and the second mounting chamber 2.

Compared to the technology disclosed in CN217643267U, in this embodiment, only a third slot 34 at the bottom of the cross bar 03 is required. The second mounting chamber 2 only needs to engage with the bottom of the cross bar 03, eliminating the need for an additional locking structure provided at the top of cross bar 03 and upper side walls of second mounting chamber 2. Consequently, this simplifies the structure of both the cross bar 03 and the second mounting chamber 2, reducing processing costs. Furthermore, by only requiring the bottom of the cross bar 03 to engage with the bent section 24 of the second mounting chamber 2, the installation issues arising from manufacturing accuracy errors of the cross bar 03 and mounting section 33 are mitigated, greatly reducing precision requirements and further lowering production costs.

Preferably, when the upper part of the bent section 24 is engaged within the third slot 34, the top surface of the mounting section 33 contacts the eighth steel wall 233 on the upper side of the inner wall of the second mounting chamber 2 (as shown in FIG. 40), enhancing the stability and strength of the mounting structure between the cross bar 03 and the second mounting chamber 2.

Additionally, the fixed end of the mounting section 33 is integrally connected to the cross bar 03, further stabilizing and strengthening the connection between cross bar 03 and mounting section 33.

Furthermore, as shown in FIGS. 41-42 and 44-45, the mounting section 33 includes a front sidewall 332 and a rear sidewall 333, both integrally connected to the cross bar 03. Both sidewalls have a fourth reinforcing rib 334 along their length to increase their mechanical strength and prevent deformation, which could otherwise affect the stability of the mounting between the mounting section 33 and the second mounting chamber 2.

In practice, the PV laminate 05 is connected to a junction box 06. As shown in FIGS. 31, 34, and 36, since both the cross bar 03 and junction box 06 block light, the mounting positions of the cross bar 03 and junction box 06 partially overlap with each other. Since the area for installing junction box 06 does not produce electricity. The installing area for cross bar 03 also does not reduce the photovoltaic laminate's 05 light receiving area. Thus preserving the photovoltaic conversion efficiency of the entire module.

In one example of this embodiment, as shown in FIGS. 31, 34, and 36, the cross bar 03 contains a junction box installation chamber 31 where the junction box 06 is placed. The junction box installation chamber 31 also includes a cable hole 311, allowing wires from the junction box 06 to pass through and pass outside the photovoltaic module, thus channeling the electricity generated by the photovoltaic laminate 05 outward through the wires.

Specifically, as shown in FIG. 36, the cross bar 03 includes multiple junction box installation chambers 31 for installing multiple junction boxes 06, the chambers are arranged in parallel and spaced apart. Each junction box installation chamber 31 has a cable hole 311 at the top for convenient wiring junction boxes 06.

Figures 43, 44, 45, 46:
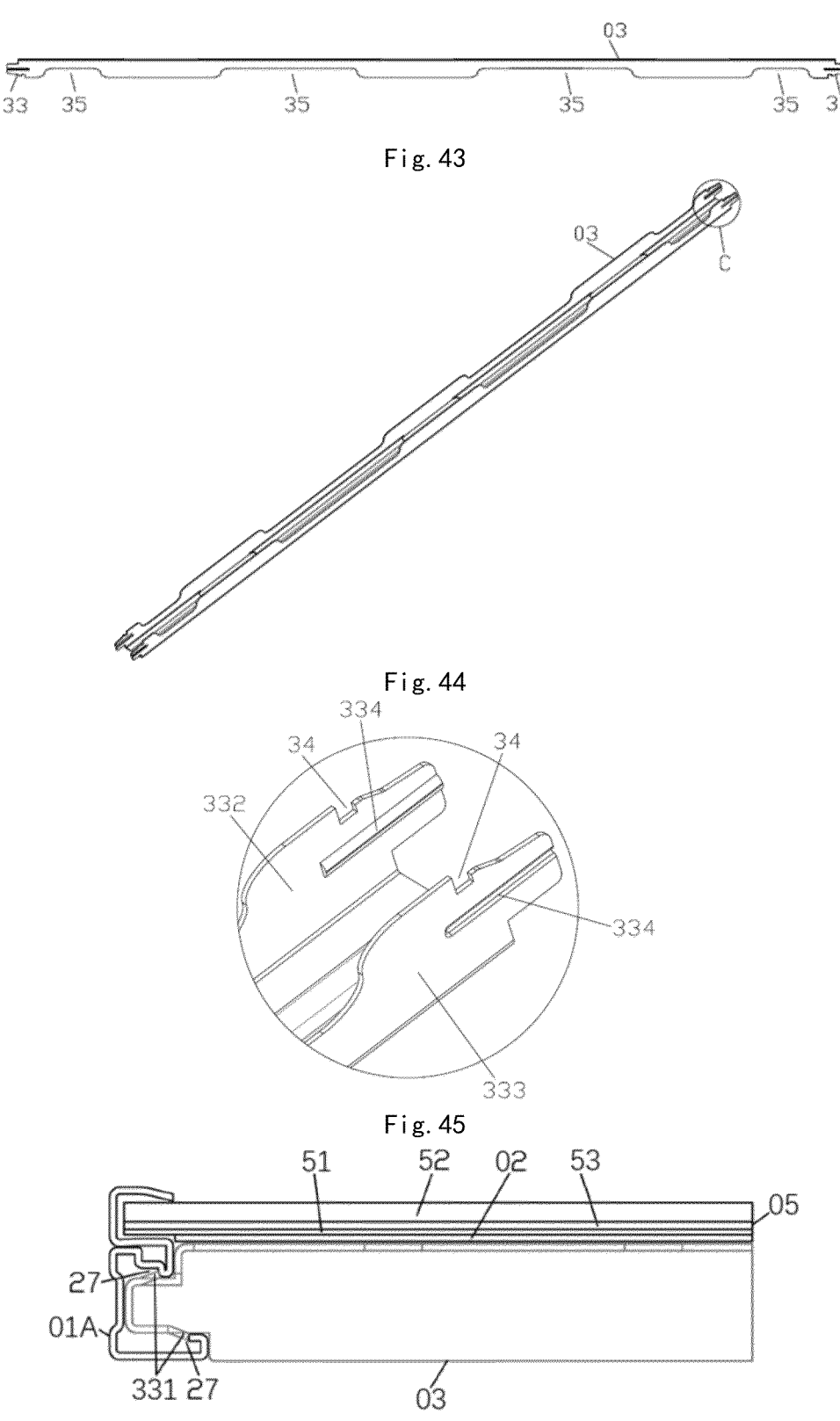
FIG. 43: A front view of a cross bar within a photovoltaic frame in Embodiment 1.
FIG. 44: A perspective schematic of a cross bar within a photovoltaic frame from another viewing angle in Embodiment 1.
FIG. 45: An enlarged view of the section labeled C in FIG. 44.
FIG. 46: A partial cross-sectional schematic of the left end of a photovoltaic module with a dual-glass front panel in Embodiment 1.

In another example of this embodiment, as shown in FIGS. 42 and 45, the front and rear edges of the steel plate are bent downward to form the front sidewall 332 and rear sidewall 333 of the cross bar 03, creating an open-bottomed, hollow ⊓ -shaped structure that accommodates the junction box 06. The top surface of the cross bar 03 has a cable hole 311, allowing wires from the junction box 06 to pass through and channel the electricity generated by the photovoltaic laminate 05 outward through the wires.

Additionally, the bottom of the cross bar 03 includes notches 35 (as shown in FIGS. 41 and 43) to reduce the weight of the cross bar 03. The notches 35 are placed at areas not used for cable holes 311.

In both examples, the junction box 06 is installed within the cross bar 03, saving installation space and providing effective sealing and protection for the junction box 06. The hollow structure of the junction box installation chamber 31 also reduces the weight of the cross bar 03, making it easier to transport.

A photovoltaic module example of this embodiment, as shown in FIGS. 31, 33, and 36, includes a photovoltaic laminate 05 with a photovoltaic frame mounted around its periphery. Preferably, this photovoltaic module also includes a cross bar 03 installed on the photovoltaic frame.

Specifically, the photovoltaic frame is a rectangular structure composed of four frame strips joined end-to-end. This frame is preferably made of steel, formed using a cold-bending process. Compared to conventional aluminum frames, this steel frame offers higher mechanical strength and wind pressure resistance, making it more deformation-resistant and better suited for large photovoltaic laminates 05.

In practical applications, as shown in FIGS. 31 and 36, the photovoltaic frame is preferably rectangular, consisting of two long frame strips 01A arranged opposite each other, with one short frame strip 01B connecting one end of each long frame strip and another short frame strip 01B connecting the other ends, thus forming the rectangular frame by connecting the long and short frame strips in sequence.

Additionally, the rectangular frame includes four corner connectors 04 to secure the connections between the long frame strips 01A and the short frame strips 01B, ensuring the assembled frame's firmness and stability.

Figures 47, 48, 49, 50:
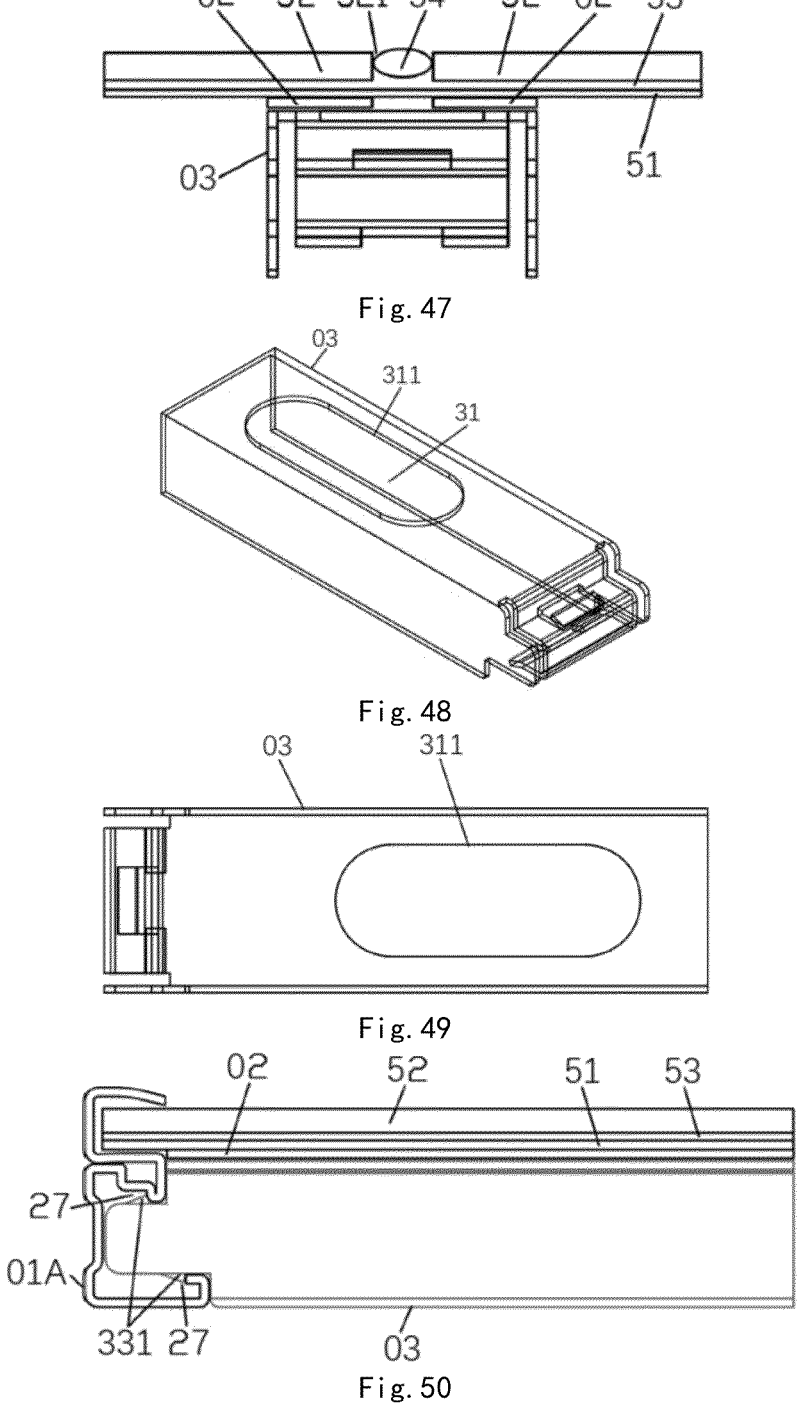
FIG. 47: A vertical sectional schematic of a photovoltaic module with a dual-glass front panel in Embodiment 1.
FIG. 48: A perspective schematic of the right end of a cross bar in Embodiment 1.
FIG. 49: A top view of the left end of a cross bar in Embodiment 1.
FIG. 50: A partial cross-sectional schematic of the left end of another photovoltaic module with a dual-glass front panel in Embodiment 1.

As shown in FIGS. 46 and 50, the photovoltaic laminate 05 consists of a back panel 51, a first adhesive film, a cell string 53, a second adhesive film, and a front panel in sequence. The first adhesive film bonds the back panel 51 with the cell string 53, while the second adhesive film bonds the cell string 53 with the front panel. Both adhesive films are similar to those in conventional photovoltaic laminates, so their details are not provided here.

For large photovoltaic modules, it is often necessary to increase the thickness of the glass front panel 52 to ensure the mechanical strength and wind resistance of both the panel and the entire module. However, a larger and thicker glass front panel 52 increases the module's weight, making it difficult to transport and install. To improve portability and ease of installation, it may be necessary to reduce the thickness of the front panel 52. Consequently, current large photovoltaic modules struggle to balance high wind resistance with easy handling and installation.

Figures 51, 52, 53:
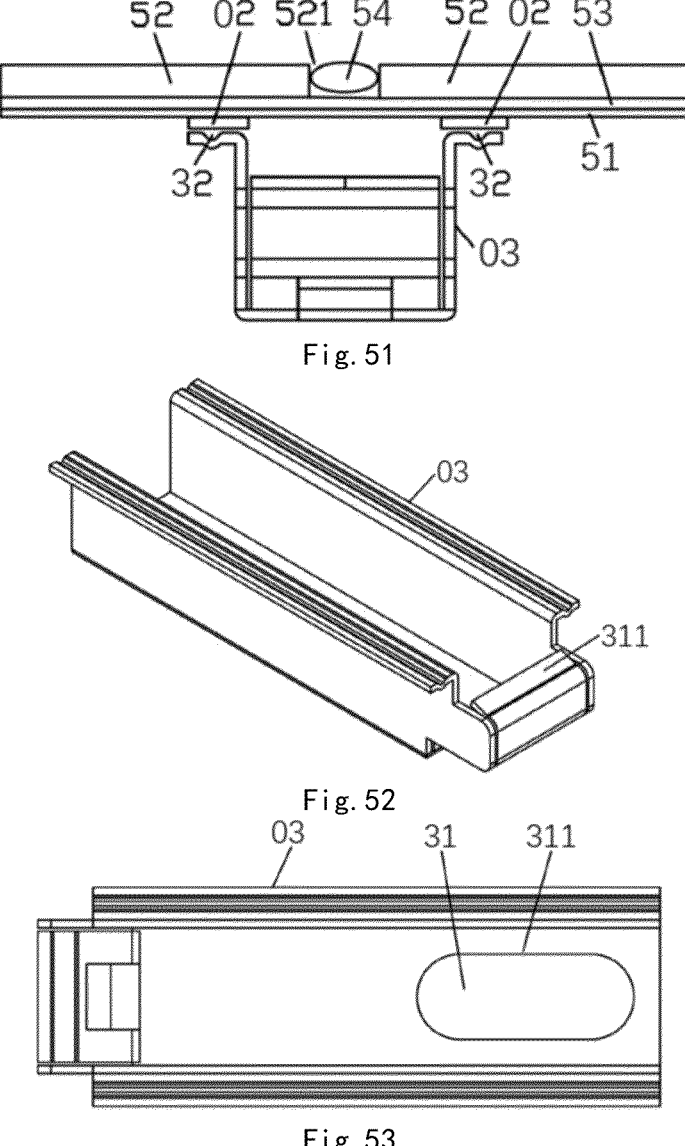
FIG. 51: A vertical sectional schematic of another photovoltaic module with a dual-glass front panel in Embodiment 1.
FIG. 52: A perspective schematic of the right end of another cross bar in Embodiment 1.
FIG. 53: A top view of the left end of another cross bar in Embodiment 1.

Based on this, an optimal photovoltaic module design in this embodiment is as follows:

As shown in FIGS. 47 and 51, the front panel consists of two glass panels 52 arranged side-by-side on the second adhesive film, forming a buffer gap 521 between two glass panels. A sealing strip 54 is provided within the buffer gap 521.

The sealant strip 51 is formed by injecting sealant into the buffer gap 521, ensures sealing between the two glass panels 52, preventing water, dust, or other contaminants from entering the photovoltaic laminate 05 and affecting its performance.

The sealing strip 54 is a flexible, deformable seal, allowing some elastic deformation. As a result, the flexible sealant strip cushions the two glass panels 52 against external forces such as wind pressure, further enhancing the glass panels' wind resistance.

This photovoltaic module design features two side-by-side glass panels 52 as the front panel. While the area of the photovoltaic module remains unchanged, the front panel's size is reduced by half. For example, a traditional single glass panel 52 is 1 m×2 m, while in present embodiment, each glass panel's 52 area is 1 m×1 m. With the same thickness, tests have shown that smaller panels (e.g., 1 m×1 m) are over 60% stronger than larger panels (e.g., 1 m×2 m). Thus, smaller panels e.g., 1 m×1 m) can achieve equivalent strength as larger panels (e.g., 1 m×2 m) with only half of the thickness. In the present embodiment, with the area of each individual glass panel (52) reduced a half, the thickness can be also reduced without sacrificing mechanical strength. This lighter photovoltaic module is thus easier to transport and install. In this embodiment, each glass panel 52 is 1.5-5 mm thick, with an area of 0.5-1.5 square meters. Compared to conventional panels, the smaller, thinner panels in present design are lightweight while still meeting the strength requirements for large photovoltaic modules.

Having two side-by-side glass panels 52 also reduces each panel's distance from its center to the edges, which lessens deformation or bending under wind pressure, increasing wind resistance. The buffer gap 521 between them also absorbs external force, preventing the panels from impacting each other and thus preserving the mechanical strength and wind resistance of the entire module. This arrangement, along with the sealing strip 54, provides a lightweight, high-strength, high-wind-resistance photovoltaic module.

To further reduce weight, the module's back panel 51 is preferably a lightweight back membrane rather than heavy glass.

In addition, as shown in FIGS. 36, 46-47, and 50-51, Along with the two side-by-side glass front panels 52 and buffer gap 521, the module includes a hollow cross bar 03 to further enhance the strength of the photovoltaic module.

The cross bar 03 is positioned where the projection of the buffer gap onto the back panel is overlapping with the cross bar 03. The cross bar 03 is bonded to the back panel 51 to support both glass panels 52 and the entire module. The frame is also made of steel instead of aluminum, enhancing the structural strength. The combination of steel frame and cross bar 03 effectively distributes stress away from the glass panels 52, enhancing the module's overall mechanical strength; it also allows reducing the glass front panels' thickness. In addition, the hollow cross bar 03 is lightweight, further making it easier to transport and install, Moreover, reducing the thickness of the glass panel 52 and using a steel frame lowers energy consumption, as glass and aluminum production are energy-intensive. Thus, the present module design utilizes two side-by-side glass panels 52 along with buffer gap 521, cross bar 03 and steel frame; it optimizes for lightweight, high strength, wind resistance, and low energy consumption.

The buffer gap 521 and cross bar 03 align with the position of the junction box 06, which does not perform photovoltaic functions but provides electrical connection, so adding this cross bar 03 does not affect the module's power generation. The buffer gap 521 is preferably 3-8 mm wide, with an optimal width of 4-5 mm.

In practice, each glass panel 52 is rectangular, with a length-to-width ratio of 0.5 to 2.

In one example, as shown in FIGS. 46-49, the cross bar 03 is a hollow, box-like structure with its ends snap-fitted to the long frame strips 01A. Inside the cross bar 03, it includes multiple junction box installation chamber 31 arranged in parallel, with cable holes 311 at the top and/or bottom to allow electrical connections.

In another example of this embodiment, as shown in FIGS. 50-53, the cross bar 03 is preferably configured in an inverted "JU" shape, with its ends snap into the long frame strip 01A. Inside the cross bar 03, multiple junction box installation chambers 31 are arranged in parallel, and each chamber has a cable hole 311 at the bottom. To further enhance the bonding between the adhesive layer 02 and the cross bar 03, a recessed groove 32 is preferably provided on the cross bar 03 (as shown in FIG. 51). This allows structural adhesive to flow into the groove 32. After curing a protrusion matching with the groove 32 is formed on the adhesive layer 02, which strengthens the connection between the adhesive layer 02 and the cross bar 03.

In other examples of this embodiment, as shown in FIGS. 37-45, the cross bar 03 can also be configured in a "Π" shape. That is, both the front and rear edges of the steel plate are bent downward to form the front sidewall 332 and the rear sidewall 333 of the cross bar 03. This gives the cross bar 03 a hollow, bottomless "Π" shape, suitable for installing the junction box 06. The top surface of the cross bar 03 includes cable holes 311, ensuring that wires connected to the junction box 06 pass through the hole, allowing the electricity generated by the photovoltaic laminate 05 to be transmitted externally. Additionally, a recessed groove 32 is also provided on the cross bar 03 to enhance adhesion with the adhesive layer 02.

Embodiment 2

This embodiment of a photovoltaic frame and photovoltaic module follows the specific structure described in Embodiment 1 (see FIG. 23) with the following differences:

For the corner connectors 04 in this embodiment, the first connecting wall 411 and the third connecting wall 421 are in the same plane, while the planes of the second connecting wall 412 and the fourth connecting wall 422 intersect with each other. The first and third connecting walls 411 and 421 are L-shaped, created by cutting. The first and third connecting walls 411 and 421 are preferably steel walls placed horizontally (horizontal steel wall 48), while the second and fourth connecting walls 412 and 422 are preferably steel walls placed vertically (vertical steel wall 49).

The manufacturing process for the corner connectors 04 in this embodiment is as follows:

First, cut the steel plate into the shape shown in FIG. 23. Bend the plate along the third bending line 46 in the horizontal direction and along the fourth bending line 47 in the vertical direction. Then, connect the second connecting wall 412 and the fourth connecting wall 422 by interlocking, welding, or snapping to create the corner connector 04 in this embodiment.

Although preferred embodiments of the present invention have been described, those skilled in the art, once they understand the basic inventive concept, can make further changes and modifications to these embodiments. Therefore, the claims should be interpreted to include preferred embodiments and any modifications and changes that fall within the scope.

The technical solutions in this invention have been described in detail above, with specific examples used to illustrate the principles and implementation methods. The description of the above embodiments is intended to assist in understanding the method and core concept of the invention. For those skilled in the field, there may be variations in specific implementations and applications based on the invention's concept. In summary, this description should not be interpreted as limiting the invention's scope.

What is claimed:

1. A photovoltaic frame, wherein, comprising multiple steel frame strips (01) connected end-to-end in sequence and corner connectors (04) joining steel frame strips (01) adjacent to each other at a corner; each steel frame strip (01) comprises a first mounting chamber (1) configured to secure a photovoltaic laminate using encapsulating adhesive and a second mounting chamber (2) positioned below the first mounting chamber (1) for mounting a corner connector (04); the first mounting chamber (1) comprises a first steel wall (12), a second steel wall (13) and a third steel wall (14) connected sequentially by bends, with upper and lower ends of the second steel wall (13) respectively connecting to left sides of the first steel wall (12) and third steel wall (14) to form an mounting chamber opening (11) on a right side of the first mounting chamber (1); the second mounting chamber (2) comprises a fourth steel wall (21) and a fifth steel wall (22) connected sequentially by bends, a top inside of the second mounting chamber (2) having a protruding/recessing portion (23) connected by bends to the third steel wall (14) and for an upper end of the corner connector to snap fit; upper and lower ends of the fourth steel wall (21) are connected by bends to the protruding/recessing portion (23) and one side of the fifth steel wall (22), respectively, and a free end of the fifth steel wall (22) has a bent section (24) for accommodating a lower end of the corner connector (04) to snap into place; each corner connector (04) comprises a first connecting part (41) and a second connecting part (42) joined by a bend; the first connecting part (41) and the second connecting part (42) are respectively installed within the second mounting chambers (2) of two steel frame strips (01) adjacent to each other at a corner; the first connecting part (41) comprises a first connecting wall (411) and a second connecting wall (412) connected by a bend, while the second connecting part (42) comprises a third connecting wall (421) and a fourth connecting wall (422) connected by a bend; both the first connecting wall (411) and the third connecting wall (421) are vertical or horizontal steel walls, while both the second connecting wall (412) and the fourth connecting wall (422) are horizontal or vertical steel walls; an upper end of the vertical steel wall snaps into the protruding/recessing portion (23), and the horizontal steel wall snaps into a chamber formed by the lower end of the fourth steel wall (21), the fifth steel wall (22) and the bent section (24).

2. The photovoltaic frame according to claim 1, wherein, an outer edge of the first connecting wall (411) and/or second connecting wall (412) is configured with a serrated structure (43) for connection to a steel frame strip (01) adjacent at the corner; the outer edge of the third connecting wall (421) and/or fourth connecting wall (422) is configured with a serrated structure (43) for connection to another steel frame strip adjacent at the corner; and the first connecting wall (411) and third connecting wall (421), or the second connecting wall (412) and fourth connecting wall (422) are integrally molded structure.

3. The photovoltaic frame according to claim 2, wherein a plane of the first connecting wall (411) intersects with a plane of the third connecting wall (421), while the second connecting wall (412) and the fourth connecting wall (422) lie in a same plane, and the first connecting wall (411) and third connecting wall (421) are connected by a bend.

4. The photovoltaic frame according to claim 2, wherein the first connecting wall (411) and the third connecting wall (421) lie in a same plane, while a plane of the second connecting wall (412) intersects with a plane of the fourth connecting wall (422), and the first connecting wall (411) and third connecting wall (421) form an L-shaped structure created by cutting.

5. The photovoltaic frame according to claim 2, wherein the serrated structure (43) comprises reversed teeth.

6. The photovoltaic frame according to claim 2, wherein the serrated structure (43) comprises multiple first reversed teeth (431) inclining outward from the corner connector (04) and multiple second reversed teeth (432) inclining inward from the corner connector (04), the first reversed teeth (431) and the second reversed teeth (432) arranged in alternating sequence such that tips (433) of free ends of adjacent first reversed teeth (431) and second reversed teeth (432) facing different side-directions respectively engage different inner walls of the steel frame strips (01).

7. The photovoltaic frame according to claim 6, wherein the tips (433) on both sides of the free ends of the first reversed teeth (431) are respectively inclined outward and downward, and inward and upward from the corner connector (04), while the tips (433) on both sides of the free ends of the second reversed teeth (432) are respectively inclined inward and downward, and outward and upward from the corner connector (04).

8. The photovoltaic frame according to claim 3, wherein, a first reinforcing rib (423) is provided at the bent connection between the first connecting wall (411) and third connecting wall (421).

9. The photovoltaic frame of claim 1, wherein the fourth steel wall (21) is positioned to a left side of the protruding/recessing portion (23) and the fifth steel wall (22), and the bent section (24) extends upward along a right side of the fifth steel wall (22).

10. The photovoltaic frame of claim 9, wherein an upper end of the bent section (24) is inclined inward to the second mounting chamber (2), or the upper end of the bent section (24) further provides an inner edge (241) horizontally extending inward to the second mounting chamber (2).

11. The photovoltaic frame according to claim 1, wherein the protruding/recessing portion (23) comprises a sixth steel wall (231) and a seventh steel wall (232), a left side of the sixth steel wall (231) engages with a lower left of the third steel wall (14), and connects to the upper end of the fourth steel wall (21) by a bend, with the sixth steel wall (231) inclining downward from left to right; a left side of the seventh steel wall (232) connects to a lower right end of the sixth steel wall (231); and a right side of the seventh steel wall (232) connects to a right side of the third steel wall (14) by a bend for transition.

12. The photovoltaic frame according to claim 1, wherein, the protruding/recessing portion (23) further comprises a sixth steel wall (231), a seventh steel wall (232), and an eighth steel wall (233), with the sixth steel wall (231) inclining upward from left to right, the seventh steel wall (232) inclining upward from right to left; an upper right end of the sixth steel wall (231) connected to an upper left end of the seventh steel wall (232), where a connecting position between the six steel wall (231) and the seventh steel wall (232) engages with a bottom of the third steel wall (14); a lower left end of the sixth steel wall (231) connected to the upper end of the fourth steel wall (21) by a bend; upper and lower end of eighth steel wall (233) respectively connects with a right side of the third steel wall (14) and a lower right end of the seventh steel wall (232) by bend.

13. The photovoltaic frame according to claim 1, wherein the protruding/recessing portion (23) further comprises a sixth steel wall (231), a seventh steel wall (232), an eighth steel wall (233), and a ninth steel wall (234); left and right sides of the sixth steel wall (231) are respectively connected to upper ends of the fourth steel wall (21) and the seventh steel wall (232) by bends, left and right sides of the eighth steel wall (233) are respectively connected to lower ends of the seventh steel wall (232) and the ninth steel wall (234) by bends, and an upper end of the ninth steel wall (234) is connected to a right side of the third steel wall (14) by bend.

14. The photovoltaic frame according to claim 13, wherein the sixth steel wall (231) is engaged with a lower left or middle lower section of the third steel wall (14).

15. The photovoltaic frame according to claim 13, wherein a second reinforcing rib (237) is bent and connected between the eighth steel wall (233) and the ninth steel wall (234), and a cross-sectional shape of the second reinforcing rib (237) is either "\" shaped or "L" shaped.

16. The photovoltaic frame according to claim 1, wherein the protruding/recessing portion (23) comprises a sixth steel wall (231), a seventh steel wall (232), an eighth steel wall (233), and a ninth steel wall (234), the sixth steel wall (231) inclines upward from left to right, the eighth steel wall (233) inclines upward from right to left; the seventh steel wall (232) is engaged with a lower section of the third steel wall (14), and left and right sides of the seventh steel wall (232) are respectively connected to an upper right end of the sixth steel wall (231) and an upper left end of the eighth steel wall (233); an upper left end of the sixth steel wall (231) is connected to the upper end of the fourth steel wall (21) by a bend, and upper and lower ends of the ninth steel wall (234) are respectively connected to a right side of the third steel wall (14) and a lower right end of the eighth steel wall (233) by a bend.

17. The photovoltaic frame according to claim 16, wherein, both the sixth steel wall (231) and the eighth steel wall (233) are provided with a third reinforcing rib (238) arranged horizontally and/or vertically.

18. The photovoltaic frame according to claim 1, wherein the protruding/recessing portion (23) comprises a sixth steel wall (231), a seventh steel wall (232), an eighth steel wall (233), a ninth steel wall (234), a tenth steel wall (235), and a eleventh steel wall (236); the eighth steel wall (233) is engaged with a lower section of the third steel wall (14); left and right sides of the eighth steel wall (233) are respectively connected to the seventh steel wall (233) and an upper end of the ninth steel wall (234) by bends; left and right sides of the sixth steel wall (231) are respectively connected to the upper end of the fourth steel wall (21) and a lower end of the seventh steel wall (232) by bends; left and right sides of the tenth steel wall (235) are respectively connected to lower ends of the ninth steel wall (234) and the eleventh steel wall (236) by bends, and an upper end of the eleventh steel wall (236) is connected to a right side of the third steel wall (14) by a bend.

19. The photovoltaic frame according to claim 1, wherein, an adhesive chamber (15) for accommodating the encapsulating adhesive is formed between inner walls of the first mounting chamber (1) and the photovoltaic laminate (05) within the first mounting chamber (1); the third steel wall (14) has a partial recess forming an overflow prevention groove (152) connected to the adhesive chamber (15); a ratio between a depth (S) of the overflow prevention groove (152) to a width (W1) of the overflow prevention groove (152) is less than 0.5 times the width (W3) of the first steel wall (12), and a ratio of the depth (S) of the overflow prevention groove (152) to a thickness (D) of the third steel wall (14) is more than 0.5 times the thickness (D) of the third steel wall (14).

20. The photovoltaic frame according to claim 19, wherein, the overflow prevention groove (152) is positioned in a middle-right section of the third steel wall (14), and a distance (d) between a right side of the overflow prevention groove (152) and a right end of the third steel wall (14) is greater than or equal to the thickness (D) of the third steel wall (14).

21. The photovoltaic frame according to claim 19, wherein, the protruding/recessing portion (23) is engaged with a left side of the third steel wall (14), and a buffer chamber (25) is formed between the protruding/recessing portion (23) and a right side of the third steel wall (14).

22. The photovoltaic frame according to claim 21, wherein the buffer chamber (25) is aligned with the overflow prevention groove (152) above and below.

23. The photovoltaic frame according to claim 1, wherein an adhesive chamber (15) for accommodating the encapsulating adhesive is formed between inner walls of the first mounting chamber (1) and the photovoltaic laminate (05) within the first mounting chamber (1); and a right end of the first steel wall (12) is pressed downward to form a lower pressed edge (121), resulting an upper left section of the adhesive chamber (15) to widen and form an adhesive collecting groove (151); the first steel wall (12) is provided with a transition section (122) smoothly connecting to the lower pressed edge (121).

24. The photovoltaic frame according to claim 23, wherein a height (a) within the adhesive collecting groove (151) is less than or equal to a thickness (D) of the first steel wall (12).

25. The photovoltaic frame according to claim 23, wherein a height of a right end of the lower pressed edge (121) is less than twice a thickness (D) of the first steel wall (12), and a height of the right end of the lower pressed edge (121) is greater than or equal to 0.5 times the thickness (D) of the first steel wall (12).

26. A photovoltaic frame, comprising a frame and a cross bar (03), wherein the frame comprises multiple steel frame strips (01) and corner connectors (04) joining steel frame strips (01) adjacent to each other at corners, characterized in that the frame is a photovoltaic frame as claimed in claim 1, the steel frame strips (01) are fixed around the photovoltaic laminate (05), and the cross bar (03) is installed on a back of the photovoltaic laminate (05) with ends of the cross bar (03) snap into the steel frame strips (01).

27. The photovoltaic frame according to claim 26, wherein an end of the cross bar (03) is mounted in a middle section of a steel frame strip (01); the photovoltaic laminate (05) is connected with a junction box (06), a junction box installation chamber (31) for placing the junction box (06) is provided inside the cross bar (03), and a cable hole (311) is provided on the junction box installation chamber (31).

28. The photovoltaic frame according to any one of claim 1 or 26, wherein the protruding/recessing portion (23) and the bent section (24) are provided with protrusions or recessed holes (26) for engaging with corner connectors (04).

29. The photovoltaic frame according to claim 26, wherein a reinforcing wall (16) is bent and connected underneath the first steel wall (12) and overlies it; a length of the reinforcing wall (16) is less than or equal to a length of the first steel wall (12); or a right side of the first steel wall (12) is inclined toward the opening (11) of the first mounting chamber (1) to secure a photovoltaic module.

30. A photovoltaic module, comprising a photovoltaic laminate (05) and a photovoltaic frame for mounting the photovoltaic laminate (05), characterized in that the photovoltaic frame is the photovoltaic frame claimed in claim 1.

31. The photovoltaic module according to claim 30, wherein the photovoltaic frame is fixed around the photovoltaic laminate (05), the photovoltaic frame is provided with a cross bar (03), and the photovoltaic laminate (05) comprises a back panel (51), a first adhesive film, a cell string (53), a second adhesive film, and a front panel stacked in sequence; the front panel comprises two glass front panels (52) mounted side by side on the second adhesive film; a buffer gap (521) is formed between the two glass front panels (52), and a sealing strip (54) is provided in the buffer gap (521).

* * * * *